US008970085B2

(12) United States Patent
Takahashi et al.

(10) Patent No.: US 8,970,085 B2
(45) Date of Patent: Mar. 3, 2015

(54) ROTOR FOR ELECTRIC ROTATING MACHINE AND METHOD OF MANUFACTURING THE SAME

(75) Inventors: Yuki Takahashi, Kariya (JP); Kazuteru Itou, Obu (JP); Yuuichirou Itou, Kariya (JP)

(73) Assignee: Denso Corporation, Kariya (JP)

(*) Notice: Subject to any disclaimer, the term of this patent is extended or adjusted under 35 U.S.C. 154(b) by 396 days.

(21) Appl. No.: 13/435,786

(22) Filed: Mar. 30, 2012

(65) Prior Publication Data

US 2012/0248920 A1    Oct. 4, 2012

(30) Foreign Application Priority Data

Apr. 1, 2011  (JP) .................................. 2011-081563
Apr. 1, 2011  (JP) .................................. 2011-081589

(51) Int. Cl.
*H02K 1/27*    (2006.01)
*H02K 1/32*    (2006.01)

(52) U.S. Cl.
CPC .................. *H02K 1/276* (2013.01); *H02K 1/32* (2013.01); *H02K 2213/03* (2013.01)
USPC ...... 310/216.114; 310/216.115; 310/216.116; 310/216.117; 310/216.118; 310/216.119

(58) Field of Classification Search
CPC ...... H02K 1/276; H02K 1/32; H02K 2213/03
USPC .................................................. 310/156.61
See application file for complete search history.

(56) References Cited

U.S. PATENT DOCUMENTS

| 7,743,484 | B2 | 6/2010 | Fukumaru et al. |
| 7,923,889 | B2* | 4/2011 | Tou ........................ 310/216.121 |
| 7,986,068 | B2* | 7/2011 | Suzuki et al. ............ 310/156.22 |
| 2008/0174200 | A1* | 7/2008 | Okamoto et al. ............. 310/217 |

(Continued)

FOREIGN PATENT DOCUMENTS

| JP | 04-006247 | 1/1992 |
| JP | H09-233750 | 9/1997 |
| JP | 2003-259577 | 9/2003 |

(Continued)

OTHER PUBLICATIONS

Office Action (2 pages) dated Apr. 16, 2013, issued in corresponding Japanese Application No. 2011-081563 and English translation (3 pages).

(Continued)

*Primary Examiner* — Terrance Kenerly
(74) *Attorney, Agent, or Firm* — Nixon & Vanderhye P.C.

(57) ABSTRACT

A rotor includes a rotor core comprised of magnetic steel sheets laminated in the axial direction and a pair of end plates that are respectively provided on the axial end faces of the rotor core so as to together sandwich the rotor core in the axial direction. The rotor is rotatably disposed in an electric rotating machine with a circumferential surface of the rotor core facing a stator. At least one of the end plates is configured to have through-holes, each of which is formed so as to axially penetrate the end plate, and a pressing portion that is radially positioned on the stator side of the through-holes. The pressing portion abuts a corresponding one of the axial end faces of the rotor core and exerts an axial load on the corresponding axial end face of the rotor core by an elastic force of the end plate.

16 Claims, 18 Drawing Sheets

(56) References Cited

U.S. PATENT DOCUMENTS

2008/0238219 A1* 10/2008 Hoshino et al. ............... 310/42
2011/0037340 A1* 2/2011 Tou ........................ 310/216.116

FOREIGN PATENT DOCUMENTS

| JP | 2005-130688 | 5/2005 |
| JP | 2007-124752 | 5/2007 |
| JP | 2008-178253 | 7/2008 |
| JP | 2010-004630 | 1/2010 |

OTHER PUBLICATIONS

Office Action (2 pages) dated Apr. 23, 2013, issued in corresponding Japanese Application No. 2011-081589 and English translation (2 pages).

* cited by examiner

RADIALLY INSIDE (NON-STATOR SIDE) ⟷ RADIALLY OUTSIDE (STATOR SIDE)

RADIALLY INSIDE (STATOR SIDE) ←→ RADIALLY OUTSIDE (NON-STATOR SIDE)

RADIALLY INSIDE (NON-STATOR SIDE) ←→ RADIALLY OUTSIDE (STATOR SIDE)

(7TH EMBODIMENT)

(COMPARATIVE EXAMPLE)

ROTOR FOR ELECTRIC ROTATING MACHINE AND METHOD OF MANUFACTURING THE SAME

CROSS-REFERENCE TO RELATED APPLICATION

This application is based on and claims priority from Japanese Patent Applications No. 2011-81589, filed on Apr. 1, 2011, and No. 2011-81563, filed on Apr. 1, 2011, the contents of which are hereby incorporated by reference in their entireties into this application.

BACKGROUND

1. Technical Field

The present invention relates to rotors for electric rotating machines that are used in, for example, motor vehicles as electric motors and electric generators, and to methods of manufacturing the rotors. In addition, the invention can also be applied to industrial machines and household electrical appliances.

2. Description of Related Art

There are known rotors for electric rotating machines which include a rotor core formed by stacking a plurality of magnetic steel sheets and a pair of end plates that are respectively provided on opposite axial end faces of the rotor core so as to together sandwich the rotor core (see, for example, Japanese Patent Application Publication No. H9-233750).

However, with such a laminated structure, the rotor core may spread in the axial direction thereof.

For example, when the electric rotating machine is of an inner rotor type, during high-speed rotation of the rotor, the rotor core may spread in the axial direction at the axial ends thereof on the radially outer side (i.e., on the radial side facing a stator of the electric rotating machine).

There is also known a technique for solving the above problem. Specifically, according to the technique, as shown in FIGS. 20A-20B, for each of the end plates 101 of the rotor 100, the thickness of the end plate 101 is increased at a radially outer end portion (i.e., at a stator-side end portion) thereof by protruding the radially outer end portion axially inward from the other portions of the end plate 101. Consequently, the radially outer end portions of the end plates 101 become able to press the rotor core 102 axially inward, thereby preventing the rotor core 102 from spreading at the axial ends thereof on the radially outer side.

With the above technique, however, each of the end plates 101 is deflected for enabling the radially outer end portion thereof to press the rotor core 102 axially inward. Consequently, stress concentration due to the deflection of the end plate 101 (to be shortly referred to as deflection stress concentration hereinafter) will occur at a radially inner end portion (i.e., a non-stator-side end portion) 103 of the end plate 101.

On the other hand, the radially inner end portions 103 of the end plates 101 abut a rotating shaft 106 of the rotor 100. Consequently, it is easy for concentration of load due to impact or vibration applied to the rotor 100 (to be shortly referred to impact load concentration hereinafter) to occur at the radially inner end portions 103 of the end plates 101.

That is, in the rotor 100 shown in FIGS. 20A-20B, both deflection stress concentration and impact load concentration occur at the same spots (i.e., the radially inner end portions 103) of the end plates 101.

As a result, it may be difficult to secure high durability and high impact resistance (or shock resistance) of the end plates 101.

SUMMARY

According to an exemplary embodiment, a rotor for an electric rotating machine is provided which includes a rotor core and a pair of end plates. The rotor core is comprised of a plurality of substantially annular magnetic steel sheets that are laminated in the axial direction of the rotor core. The rotor core has an opposite pair of axial end faces and a circumferential surface that extends in the circumferential direction of the rotor core and connects the axial end faces of the rotor core in the axial direction. The end plates are respectively provided on the axial end faces of the rotor core so as to together sandwich the rotor core in the axial direction. The rotor is configured to be rotatably disposed in the electric rotating machine with the circumferential surface of the rotor core radially facing a stator of the electric rotating machine. At least one of the end plates is configured to have a plurality of through-holes, each of which is formed so as to axially penetrate the end plate, and a pressing portion that is radially positioned on the stator side of the through-holes. The pressing portion abuts a corresponding one of the axial end faces of the rotor core and exerts an axial load on the corresponding axial end face of the rotor core by an elastic force of the end plate.

With the above configuration, the rotor core is prevented, by the axial load exerted by the pressing portion of the at least one of the end plates, from spreading at the axial ends thereof on the radial side facing the stator. At the same time, the at least one of the end plates is deflected axially outward by the reaction force of the rotor core, inducing stress (to be referred to as deflection stress hereinafter) therein.

However, for the at least one of the end plates, with the through-holes formed therein, the deflection stress is prevented from concentrating on a non-stator-side end portion of the end plate. More specifically, the rigidity of the end plate is lowered in the vicinities of the through-holes. That is, the rigidity of the end plate in the vicinities of the through-holes is lower than that at the non-stator-side end portion of the end plate. Consequently, the deflection stress is mainly induced in the vicinities of the through-holes, thus preventing deflection stress concentration from occurring at the non-stator-side end portion where it is easy for impact load concentration to occur.

As a result, it is possible to reduce the total stress induced in the non-stator-side end portion, thereby securing both high durability and high impact resistance of the at least one of the end plates.

According to another exemplary embodiment, a rotor for an electric rotating machine is provided which includes a rotor core and a pair of end plates. The rotor core is comprised of a plurality of substantially annular magnetic steel sheets that are laminated in the axial direction of the rotor core. The rotor core has an opposite pair of axial end faces and a circumferential surface that extends in the circumferential direction of the rotor core and connects the axial end faces of the rotor core in the axial direction. The end plates are respectively provided on the axial end faces of the rotor core so as to together sandwich the rotor core in the axial direction. The rotor is configured to be rotatably disposed in the electric rotating machine with the circumferential surface of the rotor core radially facing a stator of the electric rotating machine. At least one of the end plates is configured to have a proximal portion, a distal portion that is radially positioned on the stator side of the proximal portion, and an intermediate bent portion formed between the proximal and distal portions. The at least one of the end plates is mounted to a corresponding one of the axial end faces of the rotor core with the intermediate bent portion elastically deformed, so that at least part of the distal portion is kept in pressed contact with the corresponding axial end face of the rotor core by an elastic force of the intermediate bent portion. In other words, at least part of the distal portion abuts and exerts an axial load on the corresponding axial end face of the rotor core.

With the above configuration, the rotor core is prevented, by the axial load exerted by the at least part of the distal portion, from spreading at the axial ends thereof on the radial side facing the stator. At the same time, the at least one of the end plates is deflected axially outward by the reaction force of the rotor core, inducing deflection stress therein.

However, for the at least one of the end plates, with the intermediate bent portion formed therein, the deflection stress is prevented from concentrating on a non-stator-side end portion of the end plate. More specifically, the deflection stress is mainly induced around the intermediate bent portion, thus preventing deflection stress concentration from occurring at the non-stator-side end portion where it is easy for impact load concentration to occur.

As a result, it is possible to reduce the total stress induced in the non-stator-side end portion, thereby securing both high durability and high impact resistance of the at least one of the end plates.

In addition, in the rotor 100 according to the related art shown in FIGS. 20A and 20B, for increasing the thickness of the end plates 101 at the radially outer end portions thereof, it is necessary to perform a cutting or machining process for the end plates 10. In comparison, in the exemplary embodiment, the intermediate bent portion of the at least one of the end plates is formed by bending. That is, it is unnecessary to perform a cutting or machining process for the at least one of the end plates for the purpose of preventing the rotor core from spreading. As a result, it is possible to simplify the manufacturing process of the rotor and thereby reduce the manufacturing cost of the same.

According to another exemplary embodiment, there is also provided a method of manufacturing a rotor for an electric rotating machine. The method includes the steps of: (1) preparing a rotor core, a rotating component, and a pair of end plates, the rotor core being comprised of a plurality of substantially annular magnetic steel sheets that are laminated in an axial direction of the rotor core, the rotor core having an opposite pair of axial end faces and a circumferential surface that extends in a circumferential direction of the rotor core and connects the axial end faces of the rotor core in the axial direction; (2) fixing the rotating component to the rotor core so as to allow the rotating component to rotate together with the rotor core; (3) mounting the end plates respectively to the axial end faces of the rotor core so that the rotor core is sandwiched between the end plates in the axial direction; and (4) fixing the end plates to the rotating component. Further, the rotor is configured to be rotatably disposed in the electric rotating machine with the circumferential surface of the rotor core radially facing a stator of the electric rotating machine. At least one of the end plates prepared in the preparing step has a proximal portion, a distal portion that is radially positioned on a stator side of the proximal portion, an intermediate bent portion formed between the proximal and distal portions, and a hollow cylindrical boss portion that is formed at a non-stator-side end of the proximal portion so as to protrude from the proximal portion axially outward. In the mounting step, the at least one of the end plates is mounted to a corresponding one of the axial end faces of the rotor core with the intermediate bent portion elastically deformed, so that at least part of the distal portion is kept in pressed contact with the corresponding axial end face of the rotor core by an elastic force of the intermediate bent portion. In the step of fixing the end plates to the rotating component, the at least one of the end plates is fixed to the rotating component by lock-seaming the boss portion of the end plate to the rotating component with at least part of the proximal portion of the end plate abutting the corresponding axial end face of the rotor core.

With the above method, during the lock seaming process, the at least one of the end plates is prevented from moving in the axial direction. As a result, without axial movement of the at least one of the end plates, it is possible to reliably perform the lock seaming process. Moreover, it is also possible to reliably set the axial load exerted by the at least part of the distal portion on the corresponding axial end face of the rotor core. In addition, it is also possible to secure a higher joining strength between the boss portion and the rotating component in comparison with the case of crimping the boss portion to the rotating component at predetermined circumferential positions using a punch.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
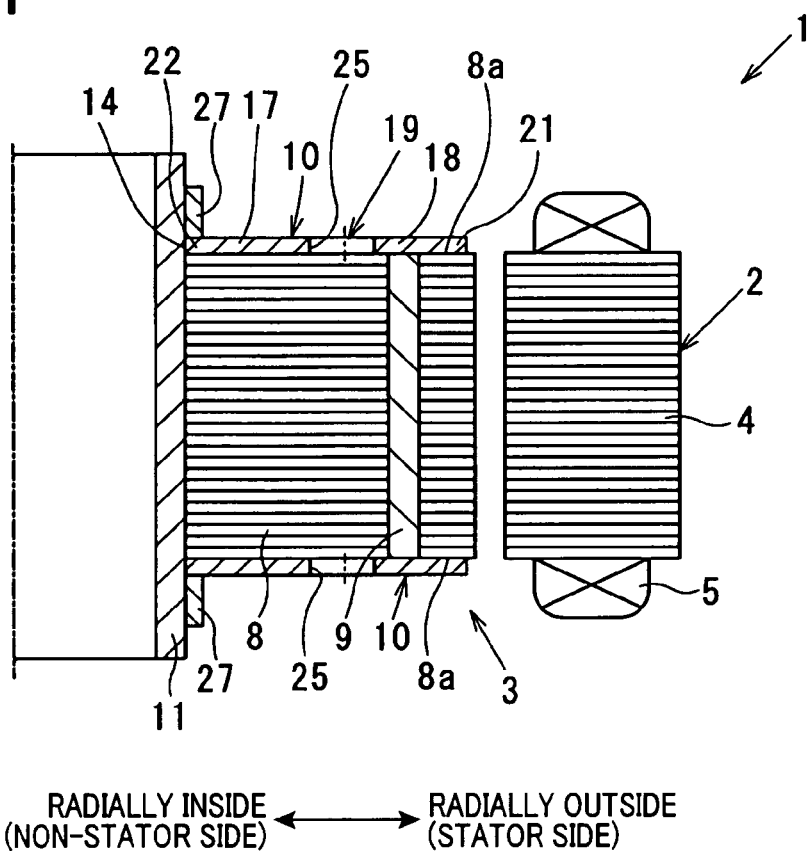
FIG. 1 is a schematic cross-sectional view illustrating the overall configuration of an electric rotating machine which includes a rotor according to a first embodiment.

Exemplary embodiments will be described hereinafter with reference to FIGS. 1-19. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

[First Embodiment]

FIG. 1 shows the overall configuration of an electric rotating machine 1 which includes a rotor 3 according to a first embodiment.

In this embodiment, the electric rotating machine 1 is configured as a motor generator that can function both as an electric motor and as an electric generator in, for example, a hybrid or electric vehicle.

As shown in FIG. 1, the electric rotating machine 1 includes a hollow cylindrical stator 2 and the rotor 3 that is rotatably disposed radially inside of the stator 2. That is to say, in the present embodiment, the electric rotating machine 1 is of an inner rotor type. In addition, it should be noted that for the sake of simplicity, only half of the electric rotating machine 1 is shown in FIG. 1.

The stator 2 includes a stator core 4 and a three-phase stator coil 5. The stator core 4 is formed, by laminating a plurality of magnetic steel sheets, into a hollow cylindrical shape. The stator coil 5 is mounted on the stator core 4.

When the electric rotating machine 1 operates as an electric motor, the stator 2 creates, upon supply of three-phase alternating current to the stator coil 5, a rotating magnetic field which causes the rotor 3 to rotate. On the other hand, when the electric rotating machine 1 operates as an electric generator, the rotor 3 is driven by, for example, an internal combustion engine of the vehicle to rotate, thereby inducing three-phase alternating current in the stator coil 5.

The rotor 3 is disposed concentrically with and radially inside of the stator 2. The rotor 3 includes a rotor core 8, a plurality of permanent magnets 9 embedded in the rotor core 8, a pair of end plates 10, and a rotating shaft 11. That is to say, in the present embodiment, the rotor 3 is configured as an Interior Permanent Magnet (IPM) rotor.

The rotor core 8 is cylindrical in shape and comprised of a plurality of substantially annular magnetic steel sheets that are laminated in the axial direction of the rotor core 8.

The permanent magnets 9 are embedded in the rotor core 8 so as to form a plurality of magnetic poles on the radially outer periphery of the rotor core 8. The magnetic poles are arranged in the circumferential direction of the rotor core 8 at predetermined intervals so that the polarities of the magnetic poles alternate between north and south in the circumferential direction.

The end plates 10 are respectively provided on opposite axial end faces 8a of the rotor core 8 so as to together sandwich the rotor core 8 in the axial direction. Each of the end plates 10 is substantially discoid in shape and made of a nonmagnetic material such as stainless steel.

In addition, each of the rotor core 8 and the end plates 10 has a through-hole 14 formed at the radial center thereof. The rotating shaft 11 is fitted in the through-holes 14 of the rotor core 8 and the end plates 10 so as to extend in the axial direction of the rotor core 8 and rotate together with the rotor core 8 and the end plates 10.

Next, the configuration of the end plates 10 of the rotor 3 according to the present embodiment will be described in detail with reference to FIGS. 1 and 2A-2B.

Figure 2A:
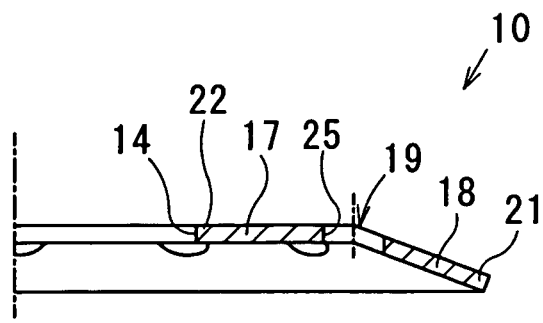
FIGS. 2A and 2B are respectively cross-sectional and axial end views of part of an end plate of the rotor in a natural state before being assembled into the rotor.
Figure 2B:
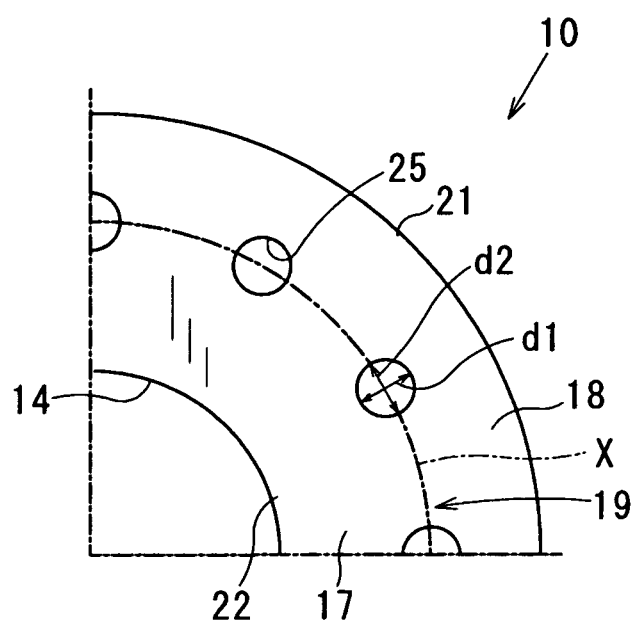

As shown in FIGS. 2A-2B, in a natural state before being assembled into the rotor 3 and without having any external load imposed thereon, each of the end plates 10 includes a proximal portion (or root portion) 17, a distal portion 18, a bent portion 19, and a plurality of through-holes 25.

The proximal portion 17 extends, from the opening edges of the through-hole 14 of the end plate 10, radially outward (i.e., toward the stator 2 side) so as to be perpendicular to the axial direction of the end plate 10 (or parallel to a corresponding one of the axial end faces 8a of the rotor core 8).

The distal portion 18 extends, on the radially outside (i.e., on the stator 2 side) of the proximal portion 17, radially outward so as to be inclined axially inward with respect to the corresponding axial end face 8a of the rotor core 8.

The bent portion 19 is formed between the proximal portion 17 and the distal portion 18. At the bent portion 19, the proximal portion 17 and the distal portion 18 intersect each other at an obtuse angle. That is, the bent portion 19 is formed by bending the end plate 10 between the proximal portion 17 and the distal portion 18 axially inward.

Each of the through-holes 25 is formed so as to penetrate the end plate 10 in the axial direction and be radially positioned between a radially outer end portion (i.e., the stator 2-side end portion) 21 and a radially inner end portion (i.e., the non-stator 2-side end portion) 22 of the end plate 10. More specifically, in the present embodiment, as shown in FIG. 2A, each of the through-holes 25 is formed in the bent portion 19 of the end plate 10.

Moreover, the through-holes 25 are arranged in the circumferential direction of the end plate 10 at predetermined intervals. More specifically, in the present embodiment, as shown in FIG. 23, a total of twelve through-holes 25 are formed in the end plate 10 so as to be equally spaced from one another in the circumferential direction of the end plate 10.

In addition, it should be noted that for the sake of simplicity, only half of the end plate 10 is shown in FIG. 2A and only a quarter of the end plate 10 is shown in FIG. 2B.

In the present embodiment, each of the through-holes 25 has a substantially circular shape. Moreover, all the diameters of the through-holes 25 are equal to each other. When viewed along the axial direction of the end plate 10, all the centers of the through-holes 25 are positioned on an imaginary circle X. The imaginary circle X has its center located at the center of rotation of the end plate 10 (or at the center of rotation of the rotor 3) and delimits the proximal portion 17 and the distal portion 18 of the end plate 10 from each other. In other words, all the through-holes 25 have their respective centers positioned on the boundary between the proximal portion 17 and the distal portion 18.

Referring back to FIG. 1, in the present embodiment, in assembling the rotor 3, the rotor core 8 is first fitted on the rotating shaft 11. Then, each of the end plates 10 is pressed on the corresponding axial end face 8*a* of the rotor core 8, thereby elastically deforming the bent portion 19 of the end plate 10 to become straight. Consequently, the distal portion 18 of the end plate 10 is displaced axially outward so that all of the proximal portion 17, the distal portion 18 and the bent portion 19 of the end plate 10 lie on the same plane perpendicular to the axial direction of the end plate 10 and abut the corresponding axial end face 8*a* of the rotor core 3. Thereafter, for each of the end plates 10, a pressure-fit ring 27 is pressure-fined onto the rotating shaft 11 from the axially outside so as to sandwich the end plate 10 between the pressure-fit ring 27 and the corresponding axial end face 8*a* of the rotor core 8 in the axial direction. As a result, all of the rotor core 8, the end plates 10 and the rotating shaft 11 are fixed together.

That is, in the present embodiment, each of the end plates 10 is elastically deformed at the bent portion 19 and assembled to the rotor core 8 with the distal portion 18 abutting the corresponding axial end face 8*a* of the rotor core 8.

Consequently, in the resultant rotor 3, for each of the end plates 10, the distal portion 18 of the end plate 10 exerts an axial load on the corresponding axial end face 8*a* of the rotor core 8; the axial load is created by the elastic force of the end plate 10 to restore the end plate 10 to its original shape shown in FIG. 2A. In other words, the distal portion 18 serves as a pressing portion of the end plate 10 which abuts the corresponding axial end face 8*a* of the rotor core 8 and exerts the axial load on the corresponding axial end face 8*a*. In particular, the radially outer end portion 21 of the end plate 10, which is included in the distal portion 18, is most reliably brought into abutment with the corresponding axial end face 8*a* of the rotor core 8 and most strongly presses the corresponding axial end face 8*a*.

Moreover, in the resultant rotor 3, as shown in FIG. 1, for each of the through-holes 25 of the end plates 10, the axially inner opening of the through-hole 25 is closed by one of the magnetic steel sheets of the rotor core 8 which is located axially outermost in the rotor core 8. That is, in the magnetic steel sheets of the rotor core 8, there are formed no through-holes that communicate with corresponding ones of the through-holes 25 of the end plates 10.

It should be noted that through-holes may also be formed in at least one of the magnetic steel sheets of the rotor core 8 which is located axially outermost in the rotor core 8, so as to communicate with corresponding ones of the through-holes 25 of the end plates 10.

Furthermore, as shown in FIG. 1, in the resultant rotor 3, each of the through-holes 25 of the end plates 10 is positioned radially inside of the permanent magnets 9 embedded in the rotor core 8.

The above-described rotor 3 according to the present embodiment has the following advantages.

In the present embodiment, the rotor core 3 includes the rotor core 8 and the pair of end plates 10. The rotor core 8 is comprised of the substantially annular magnetic steel sheets that are laminated in the axial direction of the rotor core 8. The end plates 10 are respectively provided on the axial end faces 8*a* of the rotor core 8 so as to together sandwich the rotor core 8 in the axial direction. The rotor 3 is rotatably disposed radially inside of the stator 2 in the electric rotating machine 1 with the outer circumferential surface (or the radially outer surface) of the rotor core 8 radially facing the stator 2. Each of the end plates 10 is configured to have the through-holes 25, each of which is formed so as to axially penetrate the end plate 10, and the distal portion 18 that is positioned on the radially outside (i.e., on the stator 2 side) of the through-holes 25. The distal portion 18 abuts the corresponding axial end face 8*a* of the rotor core 8 and exerts the axial load on the corresponding axial end face 8*a* by the elastic force of the end plate 10.

More specifically, in the present embodiment, each of the end plates 10 is configured to include the proximal portion 17, the distal portion 18, and the bent portion 19 between the proximal and distal portions 17 and 18. In the natural state of the end plate 10 being mounted to the corresponding axial end face 8*a* of the rotor core 8, the distal portion 18 is inclined with respect to the corresponding axial end face 8*a* of the rotor core 8 so that the distance between the distal portion 18 and the corresponding axial end face 8*a* of the rotor core 8 is decreased in the radially outer direction (i.e., in the radial direction toward the stator 2 side). Each of the end plates 10 is elastically deformed at the bent portion 19 and mounted to the corresponding axial end face 8*a* of the rotor core 8 so that the distal portion 18 is displaced axially outward to make up the pressing portion of the end plate 10. The pressing portion abuts the corresponding axial end face 8*a* of the rotor core 8 and exerts the axial load on the corresponding axial end face 8*a*; the axial load is created by the elastic force of the end plate 10 to restore the end plate 10 to its original shape shown in FIG. 2A.

With the above configuration, the rotor core 8 is prevented, by the axial loads exerted by the distal portions 18 of the end plates 10 on the corresponding axial end faces 8*a* of the rotor core 8, from spreading at the axial ends thereof on the radially outer side. At the same time, each of the end plates 10 is deflected axially outward by the reaction force of the rotor core 8, inducing deflection stress therein.

However, for each of the end plates 10, with the through-holes 25 formed in the end plate 10, the deflection stress is prevented from concentrating on the radially inner end portion (i.e., the non-stator 2-side end portion) 22 of the end plate 10. More specifically, the rigidity of the end plate 10 is lowered in the vicinities of the through-holes 25. That is, the rigidity of the end plate 10 in the vicinities of the through-holes 25 is lower than that at the radially inner end portion 22 of the end plate 10. Consequently, the deflection stress is mainly induced in the vicinities of the through-holes 25, thus preventing deflection stress concentration from occurring at the radially inner end portion 22 of the end plate 10 where it is easy for impact load concentration to occur.

As a result, it is possible to reduce the total stress induced in the radially inner end portions 22 of the end plates 10, thereby securing both high durability and high impact resistance of the end plates 10.

Moreover, in the present embodiment, for each of the end plates 10, the through-holes 25 are formed in the bent portion 19 of the end plate 10.

Consequently, with the through-holes 25 formed therein, the rigidity of the bent portion 19 is reduced, thereby making it possible to easily deform the bent portion 19 and reduce stress concentration in the bent portion 19.

In the present embodiment, each of the through-holes 25 of the end plates 10 has a substantially circular shape.

Consequently, with the substantially circular shape, it is possible to reliably cause the deflection stress to be mainly induced in the vicinities of the through-holes 25, thereby reliably preventing deflection stress concentration from occurring at the radially inner end portions 22 of the end plates 10.

In addition, as shown in FIG. 2B, with the substantially circular shape, each of the through-holes 25 of the end plates 10 has a maximum radial length d1 at its circumferential center and a maximum circumferential length d2 at its radial center. Further, the maximum radial length d1 is equal to the maximum circumferential length d2.

Figure 3A:
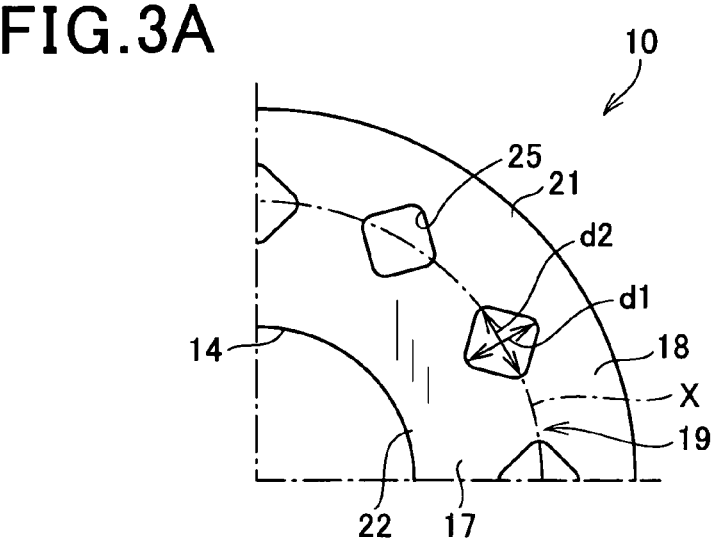
FIG. 3A is an axial end view of part of an end plate according to a modification of the first embodiment.

However, each of the through-holes 25 of the end plates 10 may also have a substantially square shape as shown in FIG. 3A. In this case, for each of the through-holes 25, the maximum radial length d1 is still equal to the maximum circumferential length d2. Therefore, with the substantially square shape, it is possible to achieve the same advantageous effects as with the substantially circular shape shown in FIG. 2B.

Figure 3B:
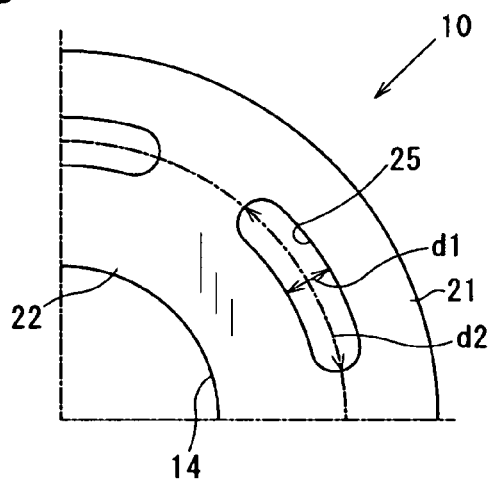
FIG. 3B is an axial end view of part of an end plate according to another modification of the first embodiment.
Figure 3C:
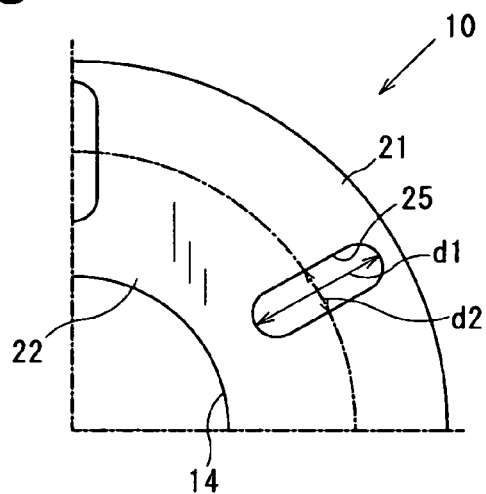
FIG. 3C is an axial end view of part of an end plate according to yet another modification of the first embodiment.

Moreover, each of the through-holes 25 of the end plates 10 may also be an elongated hole as shown in FIG. 3B, which is elongated in the circumferential direction so that the maximum radial length d1 is less than the maximum circumferential length d2 (i.e., d1<d2). Alternatively, each of the through-holes 25 may also be an elongated hole as shown in FIG. 3C, which is elongated in the radial direction so that the maximum radial length d1 is greater than the maximum circumferential length d2 (i.e., d1>d2). However, in those cases, it is still preferable that the difference between d1 and d2 be as small as possible.

Figure 4A:
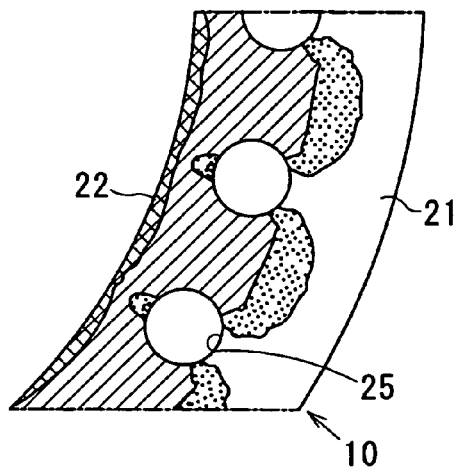
FIG. 4A is a schematic view illustrating the distribution of stress in the end plate shown in FIGS. 2A-2B.
Figure 4B:
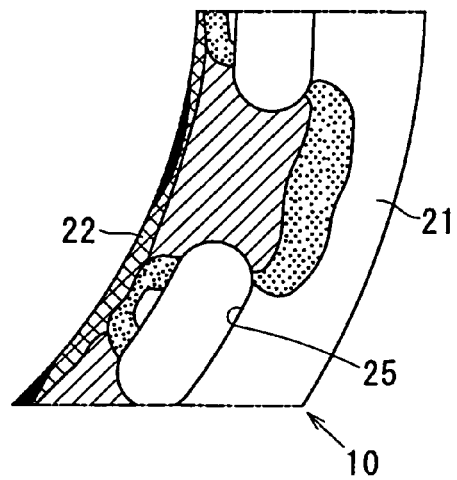
FIG. 4B is a schematic view illustrating the distribution of stress in the end plate shown in FIG. 3B.
Figure 4C:
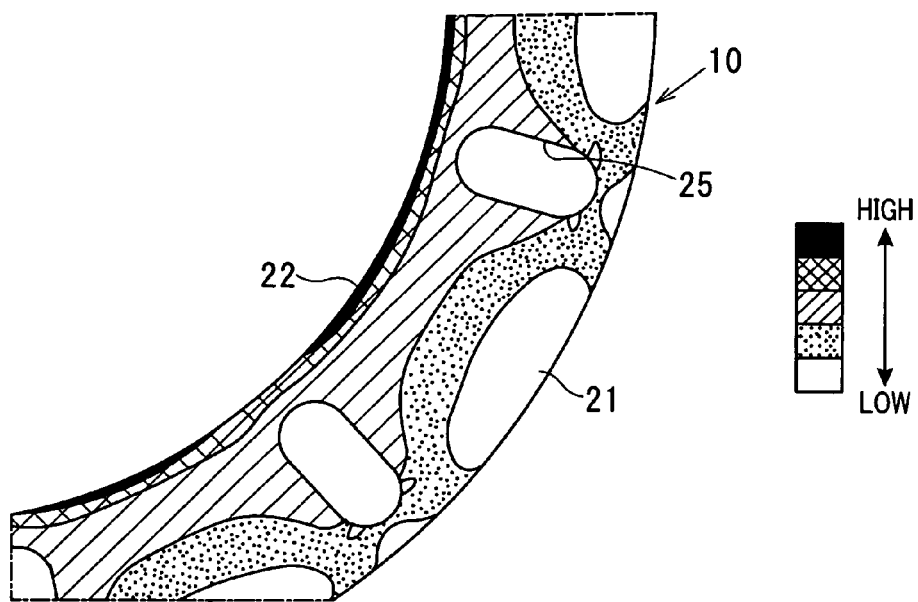
FIG. 4C is a schematic view illustrating the distribution of stress in the end plate shown in FIG. 3C.

FIG. 4A shows the distribution of stress in each of the end plates 10 with an impact load axially applied to the radially inner end portions 22 of the end plates 10 in the case of the through-holes 25 having the substantially circular shape as shown in FIG. 2B. FIG. 4B shows the distribution of stress in each of the end plates 10 with the impact load axially applied to the radially inner end portions 22 of the end plates 10 in the case of the through-holes 25 being circumferentially elongated as shown in FIG. 3B. FIG. 4C shows the distribution of stress in each of the end plates 10 with the impact load axially applied to the radially inner end portions 22 of the end plates 10 in the case of the through-holes 25 being radially elongated as shown in FIG. 3C.

As seen from FIGS. 4A-4C, in each of the three cases, the deflection stress is induced in the vicinities of the through-holes 25 (especially between the through-holes 25); thus, the deflection stress is prevented from concentrating on the radially inner end portion 22 of the end plate 10. Moreover, in the case of the through-holes 25 having the substantially circular shape, the stress concentration on the radially inner end portion 22 of the end plate 10 is more effectively reduced in comparison with the other two cases.

[Second Embodiment]

This embodiment illustrates a rotor 3 which has a similar configuration to the rotor 3 according to the first embodiment; accordingly, only the differences therebetween will be described hereinafter.

In the first embodiment, for each of the end plates 10, each of the through-holes 25 of the end plate 10 has the substantially circular shape. Moreover, all the diameters of the through-holes 25 are equal to each other (see FIG. 2B).

Figure 5A:
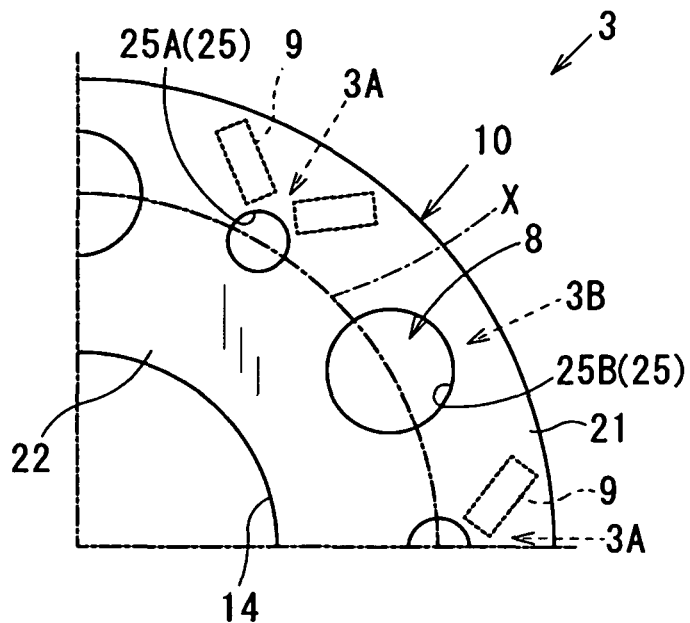
FIG. 5A is an axial end view illustrating the configuration of a rotor according to a second embodiment.

In comparison, in the present embodiment, as shown in FIG. 5A, for each of the end plates 10, each of the through-holes 25 of the end plate 10 also has a substantially circular shape. However, the diameters of the through-holes 25 vary according to the circumferential positions of the through-holes 25.

Specifically, in the present embodiment, the rotor 3 includes a plurality of auxiliary magnetic poles 3B in addition to the magnetic poles 3A formed by the permanent magnets 9 (to be referred to as main magnetic poles 3A hereinafter). Each of the auxiliary magnetic poles 3B is formed by a portion of the rotor core 8 between a circumferentially-adjacent pair of the main magnetic poles 3A and serves to produce reluctance torque of the electric rotating machine 1.

More specifically, in the present embodiment, as shown in FIG. 5A, each of the main magnetic poles 5A is formed by a pair of the permanent magnets 9 that are arranged in the rotor core 8 so that when viewed along the axial direction of the rotor core 8, the permanent magnets 9 of the pair together form a substantially V-shape that opens radially outward (i.e., toward the stator 2 side). Moreover, for each circumferentially-adjacent pair of the main magnetic poles 5A, that portion of the rotor core 8 which exists between the pair of the main magnetic poles 5A makes up a magnetic salient-pole portion through which it is easy for magnetic flux to pass; the magnetic salient-pole portion serves an auxiliary magnetic poles 3B to produce reluctance torque of the electric rotating machine 1.

Each of the through-holes 25 is formed at a circumferential position corresponding to one of the main and auxiliary magnetic poles 3A and 313. In other words, each of the through-holes 25 is circumferentially positioned so as to radially align with one of the main and auxiliary magnetic poles 3A and 3B. Hereinafter, those of the through-holes 25 which are respectively formed at the circumferential positions corresponding to the main magnetic poles 3A will be refereed to as first through-holes 25A; the other through-holes 25 which are respectively formed at the circumferential positions corresponding to the auxiliary magnetic poles 3B will be referred to as second through-holes 25B.

The first through-holes 25A are alternately arranged with the second through-holes 25B in the circumferential direction of the end plate 10 (or the circumferential direction of the rotor core 8). Moreover, when viewed along the axial direction of the end plate 10, all the centers of the first and second through-holes 25A and 25B are positioned on an imaginary circle X that has its center located at the center of rotation of the end plate 10 (or at the center of rotation of the rotor 3).

In addition, as in the first embodiment (see FIG. 1), the imaginary circle X is positioned radially inside of the permanent magnets 9, and each of the permanent magnets 9 has its axial end faces respectively abutting the end plates 10. It is preferable that each of the first through-holes 25A of the end plates 10 does not overlap any of the permanent magnets 9 in the radial direction of the rotor core 8.

Furthermore, in the present embodiment, the diameter of the first through-holes 25A is less than that of the second through-holes 25B. In other words, the opening area of the first through-holes 25A is less than that of the second through-holes 25B.

The above-described rotor 3 according to the present embodiment has the same advantages as the rotor 3 according to the first embodiment. In addition, the rotor 3 according to the present embodiment further has the following advantages.

In operation of the electric rotating machine 1, the temperature of the permanent magnets 9 can be easily increased by the heat due to eddy-current loss. However, in the present embodiment, by setting small the opening area of the first through-holes 25A that are positioned closer to the corresponding permanent magnets 9, it is possible to effectively remove heat from the permanent magnets 9 by heat conduction. Moreover, by setting large the opening area of the second through-holes 25B that are positioned further from the corresponding permanent magnets 9, it is possible to reliably cause the deflection stress to be mainly induced in the vicinities of the second through-holes 25B, thereby reliably preventing deflection stress concentration from occurring at the radially inner end portions 22 of the end plates 10.

In addition, in the present embodiment, each of the permanent magnets 9 has its axial end faces respectively abutting the end plates 10. However, even when the axial end faces of the permanent magnets 9 do not abut the end plates 10, it is still possible to transfer heat from the permanent magnets 9 to the end plates 10 via the rotor core 8 provided that the axial end faces of the rotor core 8 respectively abut the end plates 10.

Figure 5B:
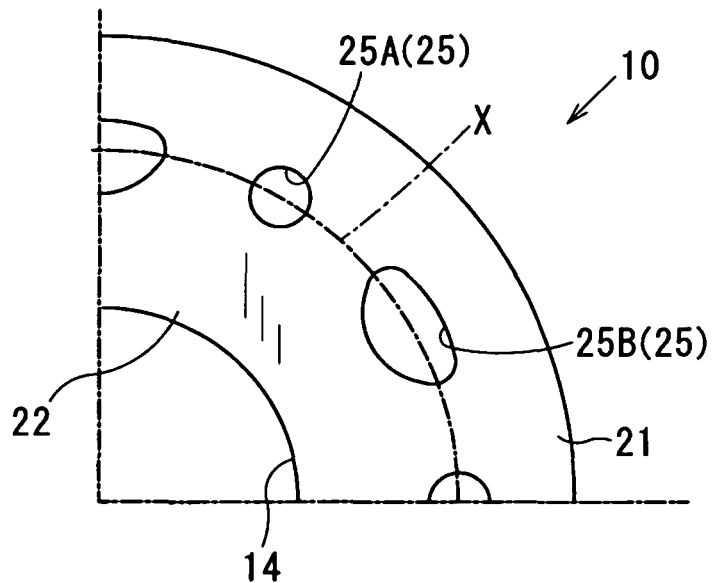
FIG. 5B is an axial end view of an end plate according to a modification of the second embodiment.

In the present embodiment, the first and second through-holes 25A and 25B have the substantially circular shapes as shown in FIG. 5A. However, as shown in FIG. 5B, it is also possible for each of the second through-holes 25B to have a non-circular shape shortened in the radial direction and elongated in the circumferential direction of the end plate 10.

Figure 6A:
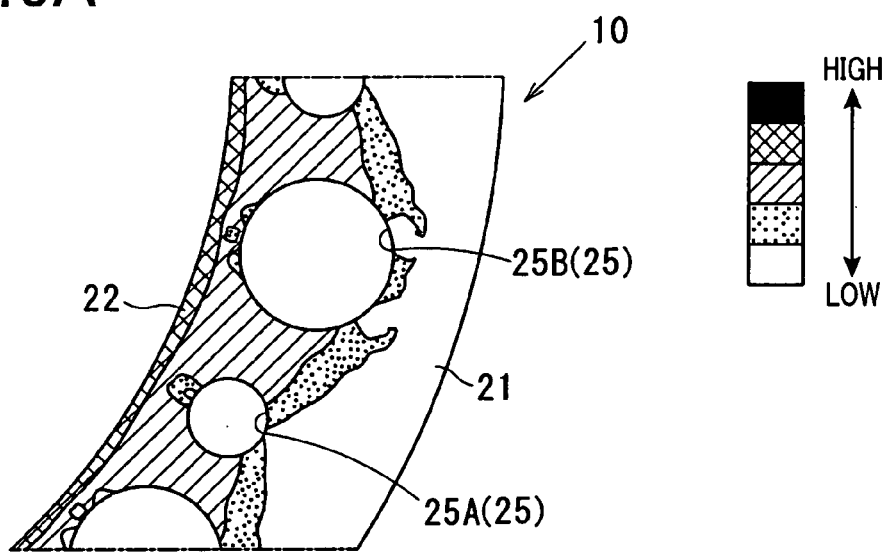
FIG. 6A is a schematic view illustrating the distribution of stress in an end plate of the rotor according to the second embodiment.
Figure 6B:
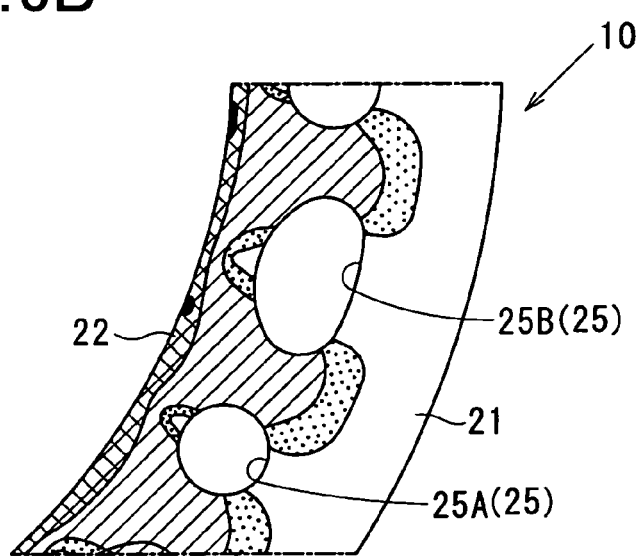
FIG. 6B is a schematic view illustrating the distribution of stress in the end plate shown in FIG. 5B.

FIG. 6A shows the distribution of stress in each of the end plates 10 with an impact load axially applied to the radially inner end portions 22 of the end plates 10 in the case of the first and second through-holes 25A and 25B having the substantially circular shapes as shown in FIG. 5A. FIG. 6B shows the distribution of stress in each of the end plates 10 with the impact load axially applied to the radially inner end portions 22 of the end plates 10 in the case of the first and second through-holes 25A and 25B having the respective shapes as shown in FIG. 5B.

As seen from FIGS. 6A and 6B, in each of the two cases, the deflection stress is induced in the vicinities of the first and second through-holes 25A and 25B (especially between the first through-holes 25A and the second through-holes 253); thus, the deflection stress is prevented from concentrating on the radially inner end portion 22 of the end plate 10. Moreover, in the case of the first and second through-holes 25A and 25B having the substantially circular shapes as shown in FIG. 5A, the stress concentration on the radially inner end portion 22 of the end plate 10 is more effectively reduced in comparison with the other case.

[Third Embodiment]

This embodiment illustrates a rotor 3 which has a similar configuration to the rotor 3 according to the first embodiment; accordingly, only the differences therebetween will be described hereinafter.

In the first embodiment, for each of the end plates 10, in the natural state of the end plate 10 before being mounted to the corresponding axial end face 8a of the rotor core 8, the proximal portion 17 of the end plate 10 extends, from the opening edges of the through-hole 14 of the end plate 10, radially outward so as to be parallel to the corresponding axial end face 8a of the rotor core 8. On the other hand, the distal portion 18 of the end plate 10 extends, on the radially outside of the proximal portion 17, radially outward so as to be inclined axially inward with respect to the corresponding axial end face 8a of the rotor core 8 (see FIG. 2A).

Figure 7A:
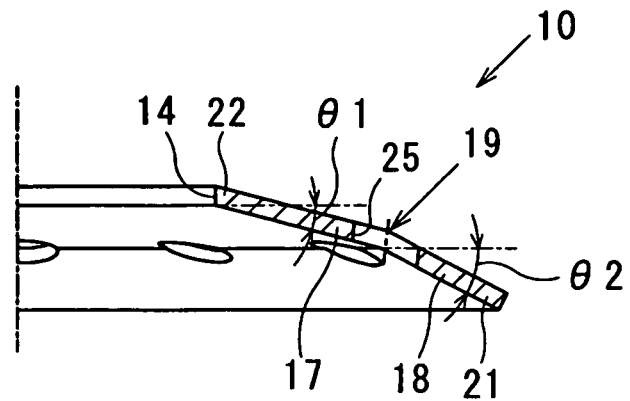
FIG. 7A is a cross-sectional view of part of an end plate according to a third embodiment.

In comparison, in the present embodiment, as shown in FIG. 7A, for each of the end plates 10, in the natural state of the end plate 10 before being mounted to the corresponding axial end face 8a of the rotor core 8, the proximal portion 17 of the end plate 10 extends, from the opening edges of the through-hole 14 of the end plate 10, radially outward so as to be inclined axially inward with respect to the corresponding axial end face 8a of the rotor core 8 at a first inclination angle $\theta1$. On the other hand, the distal portion 18 of the end plate 10 extends, on the radially outside of the proximal portion 17, radially outward so as to be inclined axially inward with respect to the corresponding axial end face 8a of the rotor core 8 at a second inclination angle $\theta2$. Here, the first inclination angle $\theta1$ represents an acute angle between the proximal portion 17 and a first imaginary plane that extends parallel to the corresponding axial end face 8a of the rotor core 8 and includes the axially inner opening edge of the through-hole 14 of the end plate 10; the second inclination angle $\theta2$ represents an acute angle between the distal portion 18 and a second imaginary plane that extends parallel to the corresponding axial end face 8a of the rotor core 8 and includes the axially outermost edge of the distal portion 18. Furthermore, the first inclination angle $\theta1$ is set to be less than the second inclination angle $\theta2$ (i.e., $\theta1<\theta2$).

In assembling the rotor 3, each of the end plates 10 is pressed on the corresponding axial end face 8a of the rotor core 8 and thereby elastically deformed so as to bring both the proximal and distal portions 17 and 18 of the end plate 10 into abutment with the corresponding axial end face 8a of the rotor core 8.

Consequently, in the resultant rotor 3, for each of the end plates 10, both the proximal and distal portions 17 and 18 of the end plate 10 together exert an axial load on the corresponding axial end face 8a of the rotor core 8; the axial load is created by the elastic force of the end plate 10 to restore the end plate 10 to its original shape shown in FIG. 7A. As a result, compared to the first embodiment, it is possible to more strongly press the corresponding axial end face 8a of the rotor core 8, thereby more reliably preventing the rotor core 8 from spreading axially outward.

[Fourth Embodiment]

This embodiment illustrates a rotor 3 which has a similar configuration to the rotor 3 according to the third embodiment; accordingly, only the differences therebetween will be described hereinafter.

In the third embodiment, for each of the end plates 10, in the natural state of the end plate 10 before being mounted to the corresponding axial end face 8a of the rotor core 8, the proximal and distal portions 17 and 18 of the end plate 10 are inclined axially inward with respect to the corresponding axial end face 8a of the rotor core 8 respectively at the first and second inclination angles $\theta1$ and $\theta2$, where $\theta1<\theta2$. Moreover, between the proximal and distal portions 17 and 18, there is formed the bent portion 19 of the end plate 10 (see FIG. 7A).

Figure 7B:
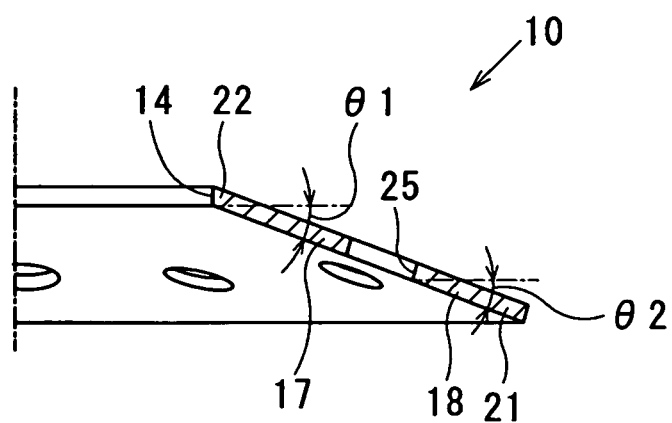
FIG. 7B is a cross-sectional view of part of an end plate according to a fourth embodiment.

In comparison, in the present embodiment, as shown in FIG. 7B, for each of the end plates 10, in the natural state of the end plate 10 before being mounted to the corresponding axial end face 8a of the rotor core 8, the proximal and distal portions 17 and 18 of the end plate 10 are inclined axially inward with respect to the corresponding axial end face 8a of the rotor core 8 respectively at the first and second inclination angles θ1 and θ2, where θ1=θ2. That is, the angle between the proximal and distal portions 17 and 18 is equal to 180°. Accordingly, there is no bent portion 19 formed between the proximal and distal portions 17 and 18.

The rotor 3 according to the present embodiment has the same advantages as the rotor 3 according to the third embodiment.

[Fifth Embodiment]

This embodiment illustrates a rotor 3 which has a similar configuration to the rotor 3 according to the first embodiment; accordingly, only the differences therebetween will be described hereinafter.

Figure 8A:
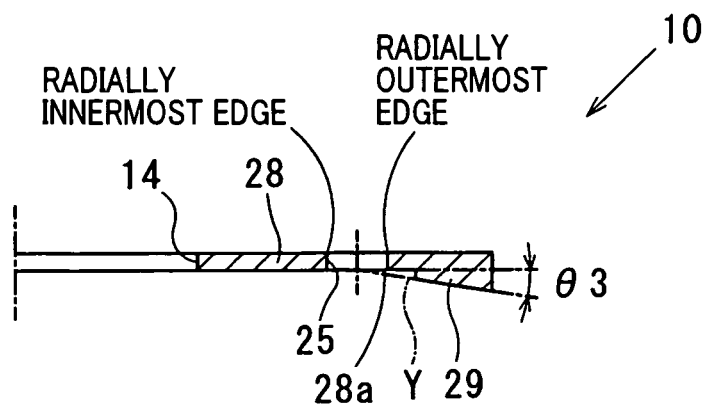
FIG. 8A is a cross-sectional view of part of an end plate of a rotor according to a fifth embodiment.

In the present embodiment, as shown in FIG. 8A, in the natural state before being mounted to the corresponding axial end face 8a of the rotor core 8, each of the end plates 10 includes a flat annular portion 28 and an annular protrusion 29. The flat annular portion 28 radially extends, from the opening edges of the through-hole 14 of the end plate 10 to the radially outer end (i.e., the stator 2-side end) of the end plate 10, so as to be perpendicular to the axial direction of the end plate 10 (or parallel to the corresponding axial end face 8a of the rotor core 8). The protrusion 29 is formed at a radially outer end portion (i.e., a stator 2-side end portion) of the flat annular portion 28 so as to protrude from the flat annular portion 28 axially inward (or toward the corresponding axial end face 8a of the rotor core 8). Consequently, with the protrusion 29, the thickness of the end plate 10 is increased at a radially outer end portion (i.e., at a stator 2-side end portion) of the end plate 10. In addition, the through-holes 25 are formed in the flat annular portion 28 so as to be positioned radially inside of (or positioned on the stator 2 side of) the protrusion 29.

Figure 8B:
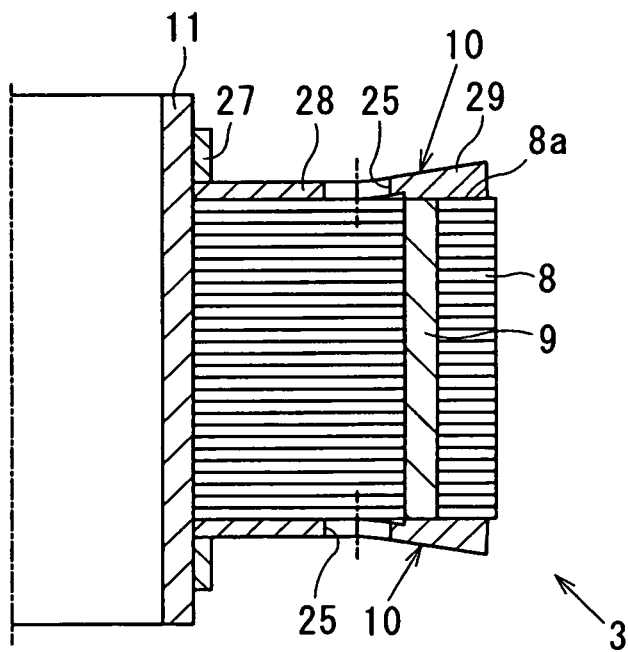
FIG. 8B is a cross-sectional view of part of the rotor according to the fifth embodiment.

Referring now to FIG. 8B, in assembling the rotor 3, each of the end plates 10 is pressed on the corresponding axial end face 8a of the rotor core 8 and elastically deformed so that the protrusion 29 is displaced axially outward to abut the corresponding axial end face 8a of the rotor core 8 together with a radially inner part of the flat annular portion 28 which is on the radially inside (or on the non-stator 2 side) of the through-holes 25. More specifically, the protrusion 29 is displaced axially outward so that an axially-inner end face of the protrusion 29 and an axially-inner end face of the radially inner part of the flat annular portion 28 lie on the same plane and together abut the axial end face 8a of the rotor core 8. Then, for each of the end plates 10, the pressure-fit ring 27 is pressure-fitted onto the rotating shaft 11 from the axially outside so as to sandwich the end plate 10 between the pressure-fit ring 27 and the corresponding axial end face 8a of the rotor core 8 in the axial direction. As a result, all of the rotor core 8, the end plates 10 and the rotating shaft 11 are fixed together.

Consequently, in the resultant rotor 3, for each of the end plates 10, the flat annular portion 28 of the end plate 10 is elastically deflected with the protrusion 29 of the end plate 10 displaced axially outward. Therefore, the protrusion 29 exerts an axial load on the corresponding axial end face 8a of the rotor core 8; the axial load is created by the elastic force of the end plate 10 to restore the end plate 10 to its original shape shown in FIG. 8A. In other words, the protrusion 29 serves as a pressing portion of the end plate 10 which abuts the corresponding axial end face 8a of the rotor core 8 and exerts the axial load on the corresponding axial end face 8a.

Moreover, referring again to FIG. 8A, for each of the end plates 10, in the natural state of the end plate 10 before being mounted to the corresponding axial end face 8a of the rotor core 8, the axially-inner end face of the protrusion 29 is inclined with respect to the corresponding axial end face 8a of the rotor core 8 so that the distance between the axial end face of the protrusion 29 and the corresponding axial end face 8a of the rotor core 8 is decreased in the radially outward direction (i.e., the radial direction toward the stator 2 side). Further, the inclination angle θ3 of the axially-inner end face of the protrusion 29 is set so that the intersection between an imaginary straight line Y and the axially-inner end face 28a of the flat annular portion 28 falls between the radially innermost and radially outermost edges of one of the through-holes 25, more particularly falls on the centerline of the through-hole 25. Here, the imaginary straight line Y is defined to extend along the axially-inner end face of the protrusion 29 and makes the inclination angle θ3 with the axially-inner end face 28a of the flat annular portion 28.

By configuring the axially-inner end face of the protrusion 29 as an inclined surface with respect to the corresponding axial end face 8a of the rotor core 8, it is possible to secure a sufficient contact area between the axially-inner end face of the protrusion 29 and the corresponding axial end face 8a of the rotor core 8, thereby allowing the protrusion 29 to reliably exert the axial load on the corresponding axial end face 8a. Further, by setting the inclination angle θ3 as above, it is possible to reliably cause the deflection stress to be mainly induced in the vicinities of the through-holes 25, thereby reliably preventing deflection stress concentration from occurring at the radially inner end portions 22 of the end plates 10.

Figure 9A:
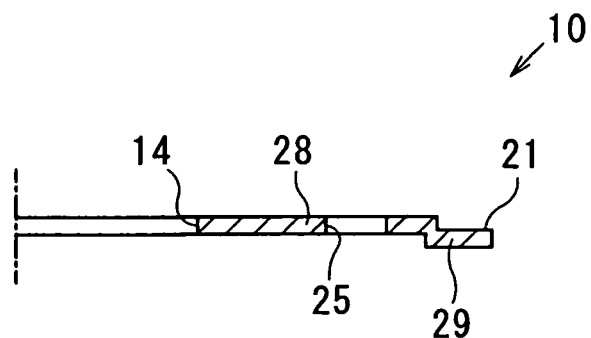
FIG. 9A is a cross-sectional view of an end plate according to a modification of the fifth embodiment.
Figure 9B:
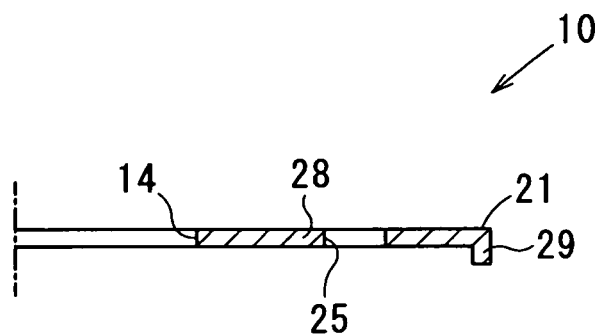
FIG. 9B is a cross-sectional view of an end plate according to another modification of the fifth embodiment.

In addition, the protrusions 29 of the end plates 10 may also be formed by half-piercing as shown in FIG. 9A. Alternatively, the protrusions 29 of the end plates 10 may also be formed by bending the radially outer end portions 21 of the end plates 10 axially inward as shown in FIG. 9B.

[Sixth Embodiment]

This embodiment illustrates a rotor 3 which has a similar configuration to the rotor 3 according to the first embodiment; accordingly, only the differences therebetween will be described hereinafter.

In the first embodiment, the electric rotating machine 1 is of an inner rotor type in which the rotor 3 is rotatably disposed radially inside of the stator 2 (see FIG. 1).

Figure 10:
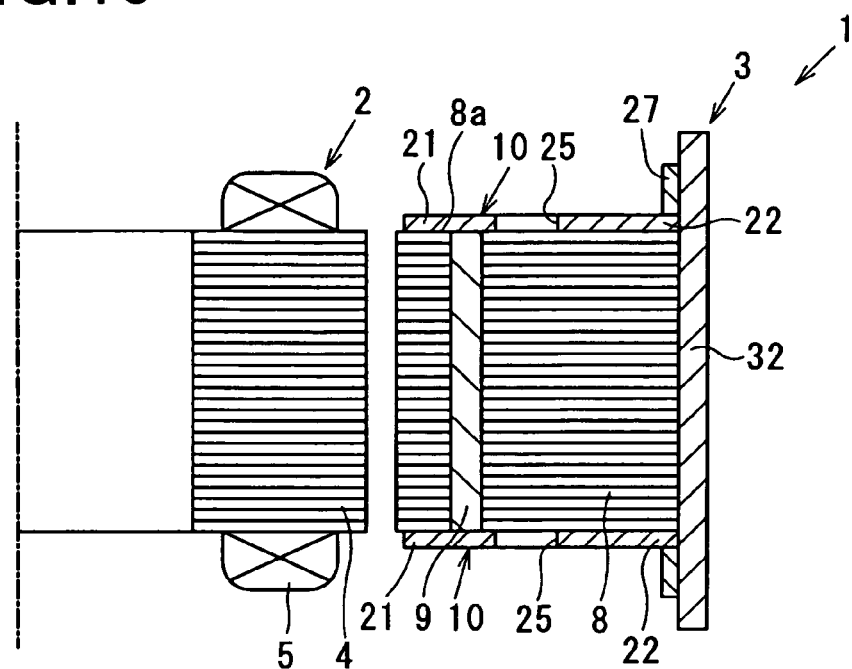
FIG. 10 is a schematic cross-sectional view illustrating the overall configuration of an electric rotating machine which includes a rotor according to a sixth embodiment.

In comparison, in the present embodiment, as shown in FIG. 10, the electric rotating machine 1 is of an outer rotor type in which the rotor 3 is rotatably disposed radially outside of the stator 2 with the inner circumferential surface (or the radially inner surface) of the hollow cylindrical rotor core 8 radially facing the stator 2.

More specifically, in the present embodiment, the rotor 3 includes, instead of the rotating shaft 11 in the first embodiment, a hollow cylindrical rotating drum 32 that is fixed on the outer circumferential surface (or the radially outer surface) of the rotor core 8 so as to rotate together with the rotor core 8.

Each of the end plates 10 is axially sandwiched between the corresponding axial end face 8a of the rotor core 8 and a pressure-fit ring 27 that is pressure-fitted on the inner circumferential surface (or the radially inner surface) of the rotating drum 32. As a result, all of the rotor core 8, the end plates 10 and the rotating drum 32 are fixed together.

The above-described rotor 3 according to the present embodiment has the same advantages as the rotor 3 according to the first embodiment.

[Seventh Embodiment]

Figure 12:
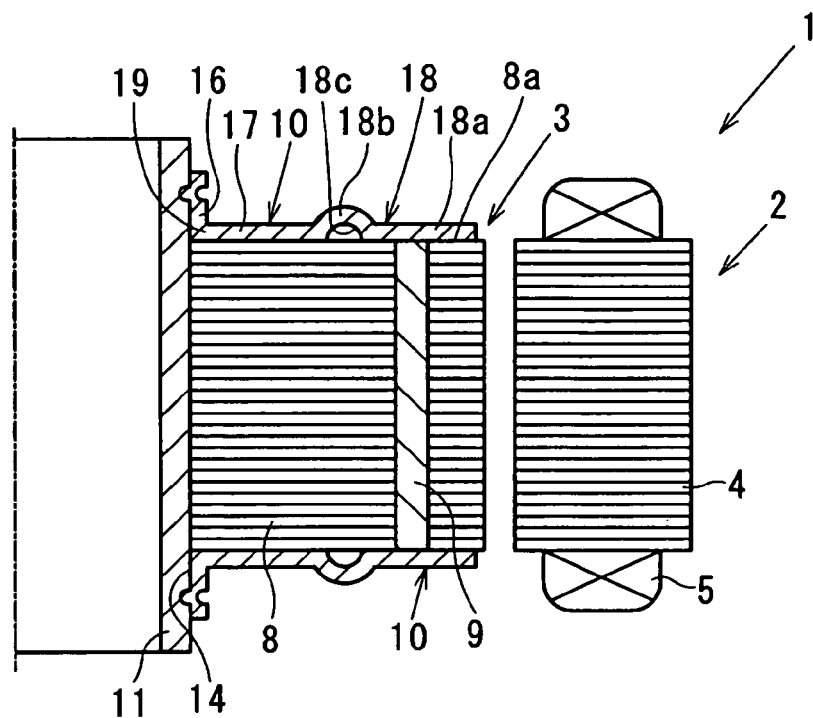
FIG. 12 is a schematic cross-sectional view illustrating the overall configuration of an electric rotating machine which includes a rotor according to a seventh embodiment.

FIG. 12 shows the overall configuration of an electric rotating machine 1 which includes a rotor 3 according to a seventh embodiment.

In this embodiment, the electric rotating machine 1 is configured as a motor generator that can function both as an electric motor and as an electric generator in, for example, a hybrid or electric vehicle.

As shown in FIG. 12, the electric rotating machine 1 includes a hollow cylindrical stator 2 and the rotor 3 that is rotatably disposed radially inside of the stator 2. That is to say, in the present embodiment, the electric rotating machine 1 is of an inner rotor type. In addition, it should be noted that for the sake of simplicity, only half of the electric rotating machine 1 is shown in FIG. 12.

The stator 2 includes a stator core 4 and a three-phase stator coil 5. The stator core 4 is formed, by laminating a plurality of magnetic steel sheets, into a hollow cylindrical shape. The stator coil 5 is mounted on the stator core 4.

The rotor 3 is disposed concentrically with and radially inside of the stator 2. The rotor 3 includes a rotor core 8, a plurality of permanent magnets 9 embedded in the rotor core 8, a pair of end plates 10, and a rotating shaft 11. That is to say, in the present embodiment, the rotor 3 is configured as an Interior Permanent Magnet (IPM) rotor.

The rotor core 8 is cylindrical in shape and comprised of a plurality of substantially annular magnetic steel sheets that are laminated in the axial direction of the rotor core 8.

The permanent magnets 9 are embedded in the rotor core 8 so as to form a plurality of magnetic poles on the radially outer periphery of the rotor core 8. The magnetic poles are arranged in the circumferential direction of the rotor core 8 at predetermined intervals so that the polarities of the magnetic poles alternate between north and south in the circumferential direction.

The end plates 10 are respectively provided on opposite axial end faces 8a of the rotor core 8 so as to together sandwich the rotor core 8 in the axial direction. Each of the end plates 10 is substantially discoid in shape and made of a nonmagnetic material such as stainless steel.

In addition, each of the rotor core 8 and the end plates 10 has a through-hole 14 formed at the radial center thereof. The rotating shaft 11 is fitted in the through-holes 14 of the rotor core 8 and the end plates 10 so as to extend in the axial direction of the rotor core 8 and rotate together with the rotor core 8 and the end plates 10.

Next, the configuration of the end plates 10 of the rotor 3 according to the present embodiment will be described in detail with reference to FIGS. 12 and 13.

In the present embodiment, each of the end plates 10 includes a boss portion 16, a proximal portion 17, an elastic contacting portion 18, and a proximal-side bent portion 19.

The boss portion 16 is cylindrical in shape and has the through-hole 14 formed therein. The boss portion 16 is formed at the radially inner end (i.e., the non-stator 2-side end) of the end plate 10 so as to protrude axially outward from the other portions of the end plate 10.

The proximal portion 17 extends, from the boss portion 16 of the end plate 10, radially outward (i.e., toward the stator 2 side) so as to be perpendicular to the axial direction of the end plate 10 (or parallel to a corresponding one of the axial end faces 8a of the rotor core 8).

The elastic contacting portion 18 extends from the proximal portion 17 radially outward (or toward the stator 2 side) and is comprised of a distal portion 18a and an intermediate bent portion 18b. The distal portion 18a is in pressed contact with the corresponding axial end face 8a of the rotor core 8 on the radially outer side (or on the stator 2 side). The intermediate bent portion 18b is formed between the proximal portion 17 and the distal portion 18a to generate an elastic force for pressing the distal portion 18a on the corresponding axial end face 8a of the rotor core 8.

Figure 13:
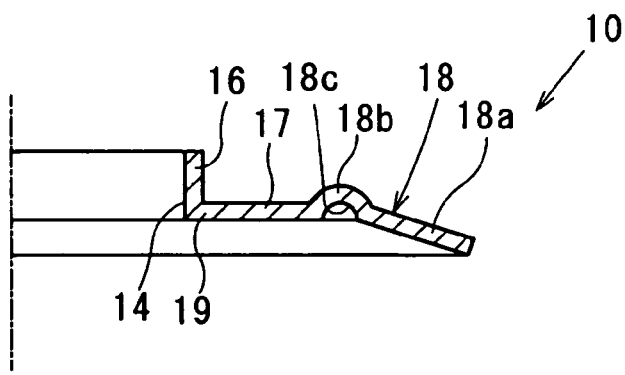
FIG. 13 is a cross-sectional view of part of an end plate of the rotor according to the seventh embodiment.

Specifically, as shown in FIG. 13, the intermediate bent portion 18b is positioned on the radially outside (or on the stator 2 side) of the proximal portion 17, and the distal portion 18a is positioned on the radially outside of the intermediate bent portion 18b. In a natural state of the end plate 10 before being mounted to the corresponding axial end face 8a of the rotor core 8 and without having any external load imposed thereon, the distal portion 18a extends from the intermediate befit portion 18b radially outward (or toward the stator 2 side) so as to be inclined axially inward with respect to the corresponding axial end face 8a of the rotor core 8. The intermediate bent portion 18b is bent so as to have an arc-shaped radial cross section that bulges axially outward. More specifically, the intermediate bent portion 18b is first bent axially outward so as to be separated from the corresponding axial end face 8a of the rotor core 3; then, it is bent so as to extend along an arc-shaped course back to the axially inward direction; thereafter, it is bent from the axially inward direction radially outward. The intermediate bent portion 18b has a concave axially-inner end face 18c separated from the corresponding axial end face 8a of the rotor core 8.

In the present embodiment, the intermediate bent portion 18b is formed over the entire circumference (or the entire angular range) of the end plate 10. In addition, the intermediate bent portion 18b may be formed, for example, by bending using a press machine.

The proximal-side bent portion 19 is formed between the axially-extending boss portion 16 and the radially-extending proximal portion 17 of the end plate 10 so as to have a substantially L-shape. That is, the proximal-side bent portion 19 is bent at substantially 90°.

Referring back to FIG. 12, in the present embodiment, in assembling the rotor 3, the rotor core 8 is first fixed on the rotating shaft 11. Then, each of the end plates 10 is pressed on the corresponding axial end face 8a of the rotor core 8, thereby elastically deforming the intermediate bent portion 18b to spread. Consequently, with the elastic deformation of the intermediate bent portion 18b, the distal portion 18a of the end plate 10 is displaced axially outward so that both the proximal and distal portions 17 and 18a of the end plate 10 lie on the same plane perpendicular to the axial direction of the end plate 10 and abut the corresponding axial end face 8a of the rotor core 3. That is, the distal portion 18a of the end plate 10 is brought into pressed contact with the corresponding axial end face 8a of the rotor core 8 by the elastic force of the intermediate bent portion 18b to restore the intermediate bent portion 18b to its original shape. Thereafter, for each of the end plates 10, the boss portion 16 of the end plate 10 is fixed to the rotating shaft 11, thereby fixing the end plate 10 also to the rotor core 8 that is fixed on the rotating shaft 11. In addition, the manner of fixing the boss portion 16 of the end plate 10 to the rotating shaft 11 will be described in detail later.

As a result, in the obtained rotor 3, for each of the end plates 10, both the proximal and distal portions 17 and 18a of the end plate 10 abut the corresponding axial end face 8a of the rotor core 8. In particular, the distal portion 18a of the end plate 10 is kept in pressed contact with the corresponding axial end face 8a of the rotor core 8 by the elastic force of the intermediate bent portion 18b. In other words, the distal portion 18a of the end plate 10 abuts and exerts an axial load on the corresponding axial end face 8a of the rotor core 8. The intermediate bent portion 18b of the end plate 10, which is elastically deformed during the assembly of the rotor 3, still keeps its arc-shaped radial cross section bulging axially outward. Therefore, the axially-inner end face 18c of the intermediate bent portion 18b is still kept concave and thus separated from the corresponding axial end face 8a of the rotor core 8.

In addition, for each of the end plates 10, the proximal-side bent portion 19 of the end plate 10 is not deformed during the assembly of the rotor 3 and thus does not urge the proximal portion 17 of the end plate 10 on the corresponding axial end face 8a of the rotor core 8. However, after the assembly of the rotor 3, when the rotor core 8 comes to axially spread and thus presses the proximal portion 17 of the end plate 10 axially outward, the proximal-side bent portion 19 is elastically deformed, thereby pressing the proximal portion 17 on the corresponding axial end face 8a of the rotor core 8 with the reaction force of the proximal-side bent portion 19.

Figure 14A:
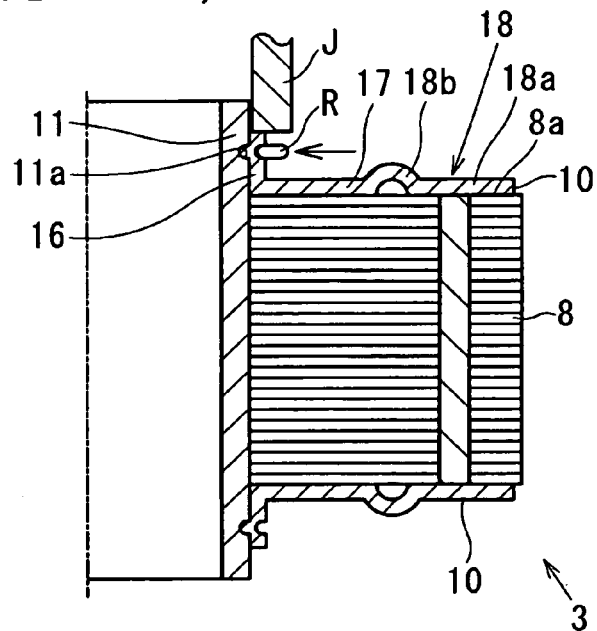
FIG. 14A is a schematic cross-sectional view illustrating a mariner of fixing a boss portion of the end plate to a rotating shaft according to the seventh embodiment.

Referring not to FIG. 14A, in the present embodiment, the boss portions 16 of the end plates 10 are fixed to the rotating shaft 11 in the following manner.

First, each of the end plates 10 is mounted to the rotating shaft 11 so as to have the boss portion 16 of the end plate 10 fated on the rotating shaft 11. Then, an axially inward force is applied by a jig J to the boss portion 16, thereby elastically deforming the intermediate bent portion 18b of the end plate 10. Consequently, with the elastic deformation of the intermediate bent portion 18b, both the proximal and distal portions 17 and 18a of the end plate 10 are brought into abutment with the corresponding axial end face 8a of the rotor core 8. Thereafter, keeping the abutment by the jig J, the boss portion 16 of the end plate 10 is fixed to the rotating shaft 11 by lock seaming.

More specifically, in the lock seaming process, the rotor 3 is rotated with the radially outer surface of the boss portion 16 of the end plate 10 pressed radially inward by a roller R. The rotating shaft 11 has an annular recess 11a that is formed in the radially outer surface of the rotating shaft 11 at the same axial position as the roller R. Consequently, by continuously pressing the radially outer surface of the boss portion 16 of the end plate 10 radially inward, the boss portion 16 is plastically deformed so that the annular recess 11a of the rotating shaft 11 is filled with the material of the boss portion 16. As a result, the boss portion 16 of the end plate 10 and the rotating shaft 11 are crimp-fixed together.

The above-described rotor 3 according to the present embodiment has the following advantages.

In the present embodiment, the rotor 3 includes the rotor core 8 and the end plates 10 that are respectively provided on the axial end faces 8a of the rotor core 8 so as to together sandwich the rotor core 8 in the axial direction. Each of the end plates 10 is configured to have the proximal portion 17, the distal portion 18a that is positioned on the radially outside (or on the stator 2 side) of the proximal portion 17, and the intermediate bent portion 18b formed between the proximal and distal portions 17 and 18a. Each of the end plates 10 is mounted to the corresponding axial end face 8a of the rotor core 8 with the intermediate bent portion 18b elastically deformed, so that the distal portion 18a is kept in pressed contact with the corresponding axial end face 8a of the rotor core 8 by the elastic force of the intermediate bent portion 18b to restore the portion 18b to its original shape. In other words, the distal portion 18a abuts and exerts an axial load on the corresponding axial end face 8a of the rotor core 8.

With the above configuration, the rotor core 8 is prevented, by the axial loads exerted by the distal portions 18a of the end plates 10 on the corresponding axial end faces 8a of the rotor core 8, from spreading at the axial ends thereof on the radially outer side. At the same time, each of the end plates 10 is deflected axially outward by the reaction force of the rotor core 8, inducing deflection stress therein.

However, for each of the end plates 10, with the intermediate bent portion 18b formed in the end plate 10, the deflection stress is prevented from concentrating on the radially inner end portion (i.e., the non-stator 2-side end portion) of the end plate 10. More specifically, the deflection stress is mainly induced around the intermediate bent portion 18b, thus preventing deflection stress concentration from occurring at the radially inner end portion of the end plate 10 where it is easy for impact load concentration to occur.

As a result, it is possible to reduce the total stress induced in the radially inner end portions of the end plates 10, thereby securing both high durability and high impact resistance of the end plates 10.

Figure 20A:
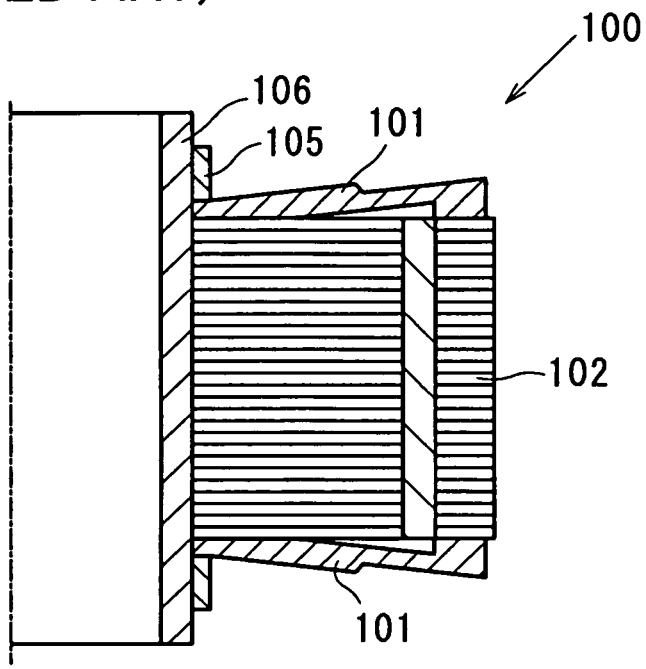
FIG. 20A is a cross-sectional view illustrating the configuration of a rotor according to a related art.
Figure 20B:
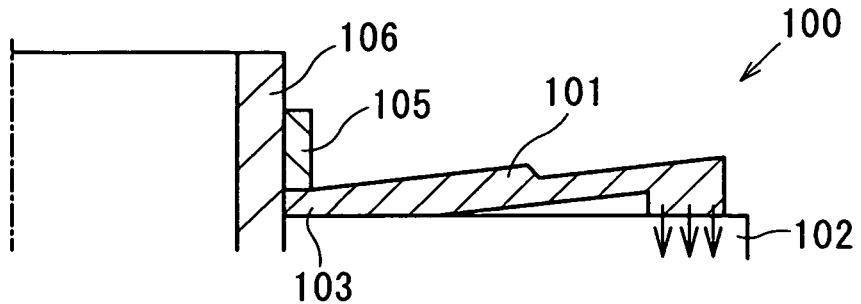
FIG. 20B is an enlarged view of part of FIG. 20A.

In addition, in the rotor 100 according to the related art shown in FIGS. 20A and 20B, for increasing the thickness of the end plates 101 at the radially outer end portions thereof, it is necessary to perform a cutting or machining process for the end plates 10. In comparison, in the present embodiment, the intermediate bent portions 18b of the end plates 10 are fanned by bending. That is, it is unnecessary to perform a cutting or machining process for the end plates 10 for the purpose of preventing the rotor core 8 from spreading. As a result, it is possible to simplify the manufacturing process of the rotor 3 and thereby reduce the manufacturing cost of the same.

In the present embodiment, for each of the end plates 10, the intermediate bent portion 18b of the end plate 10 is bent so as to have its concave axially-inner end face 18c separated from the corresponding axial end face 8a of the rotor core 8.

With the above configuration, it is possible for the intermediate bent portion 18b to more effectively absorb the deflection stress, thereby more reliably preventing deflection stress concentration from occurring at the radially inner end portion of the end plate 10.

In the present embodiment, for each of the end plates 10, the proximal portion 17 of the end plate 10 abuts the corresponding axial end face 8a of the rotor core 8.

With the above configuration, it is possible to reliably fix the boss portion 16 of the end plate 10 to the rotating shaft 11 by lock seaming.

More specially, with the proximal portion 17 of the end plate 10 abutting the corresponding axial end face 8a of the rotor core 8, it is possible to perform the lock seaming process for the boss portion 16 of the end plate 10 while pressing the end plate 10 on the corresponding axial end face 8a of the rotor core 8 with the jig J. Consequently, during the lock seaming process, the end plate 10 is prevented from moving in the axial direction. As a result, without axial movement of the end plate 10, it is possible to reliably perform the lock seaming process. Moreover, it is also possible to reliably set the axial load exerted by the distal portion 18a of the end plate 10 on the corresponding axial end face 8a of the rotor core 8 to a desired value.

Figure 14B:
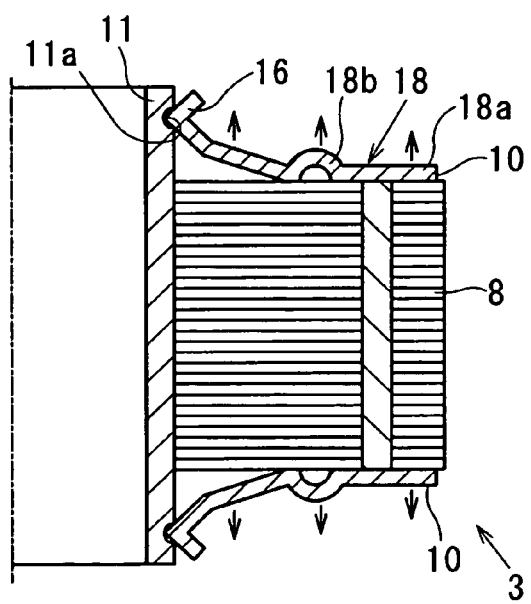
FIG. 14B is a schematic cross-sectional view illustrating a manner of fixing the boss portion of the end plate to the rotating shaft according to a comparative example.

In comparison, as shown in FIG. 14B, when each of the end plates 10 is configured so that the proximal portion 17 of the end plate 10 does not abut the corresponding axial end face 8a of the rotor core 8, it is difficult to perform the lock seaming process for the boss portion 16 of the end plate 10 while pressing the end plate 10 on the corresponding axial end face 8a of the rotor core 8 with the jig J. Further, when the boss portion 16 is fixed to the rotating shaft 11 by, instead of lock seaming, crimping the boss portion 16 to the rotating shaft 11 at predetermined circumferential positions using a punch, it is still difficult to restrict axial movement of the end plate 10 during the crimping process. As a result, without restricting axial movement of the end plate 10, it is difficult to reliably fix the boss portion 16 to the rotating shaft 11. Moreover, it is also difficult to reliably set the axial load exerted by the distal portion 18a of the end plate 10 on the corresponding axial end face 8a of the rotor core 8 to a desired value.

In the present embodiment, for each of the end plates 10, the intermediate bent portion 18b of the end plate 10 is bent so as to have the arc-shaped radial cross section that bulges axially outward.

With the above configuration, it is possible to suitably set the axial load exerted by the distal portion 18a of the end plate 10 on the corresponding axial end face 8a of the rotor core 8 by suitably setting the radius of curvature of the arc-shaped radial cross section of the intermediate bent portion 18b.

In the present embodiment, each of the end plates 10 has the hollow cylindrical boss portion 16 that protrudes axially outward and is in a radial engagement with the rotating shaft 11. By the radial engagement between the boss portion 16 and the rotating shaft 11, the end plate 10 is fixed to the rotating shaft 11. Further, since the rotating shaft 11 is fixed to the rotor core 8, the end plate 10 is also fixed to the rotor core 8 via the rotating shaft 11.

On the other hand, in the rotor 100 according to the related art shown in FIGS. 20A and 20B, each of the end plates 101 is axially sandwiched between the rotor core 102 and a fastening member (e.g., a pressure-fit ring) 105 and fixed to the rotating shaft 106 by fixing the fastening member 105 to the rotating shaft 106.

In comparison, in the present embodiment, the boss portions 16 of the end plates 10 perform the same function as the fastening members 105 in the related art. Consequently, without employing additional fastening members 105, the parts count of the rotor 3 according to the present embodiment is reduced, thereby facilitating the assembly process of the rotor 3.

Further, in the present embodiment, for each of the end plates 10, the radial engagement between the boss portion 16 of the end plate 10 and the rotating shaft 11 is established by lock-seaming the boss portion 16 to the radially outer surface of the rotating shaft 11 with the proximal portion 17 of the end plate 10 abutting the corresponding axial end face 8a of the rotor core 8.

With the above configuration, it is possible to secure a higher joining strength between the boss portion 16 of the end plate 10 and the rotating shaft 11 in comparison with the case of crimping the boss portion 16 to the rotating shaft 11 at predetermined circumferential positions using a punch.

In the present embodiment, for each of the end plates 10, the boss portion 16 of the end plate 10 is formed at the radially inner end (i.e., the non-stator 2-side end) of the proximal portion 17 so as to protrude from the proximal portion 17 axially outward. Between the boss portion 16 and the proximal portion 17, there is formed the proximal-side bent portion 19 that is bent so as to generate an elastic force to press the proximal portion 17 on the corresponding axial end face 8a of the rotor core 8.

With the above configuration, when the rotor core 8 comes to axially spread, the proximal portions 17 of the end plates 10 as well as the distal portions 18a of the end plates 10 press the corresponding axial end faces 8a of the rotor core 8 axially inward, thereby more reliably stopping the rotor core 8 from axially spreading.

Furthermore, in the present embodiment, the rotor 3 is made by a method which includes the steps of: (1) preparing the rotor core 8, the rotating shaft 11, and the end plates 10; (2) fixing the rotating shaft 11 to the rotor core so as to allow the rotating shaft 11 to rotate together with the rotor core 8; (3) mounting the end plates 10 respectively to the axial end faces 8a of the rotor core 8 so that the rotor core 8 is sandwiched between the end plates 10 in the axial direction; and (4) fixing the end plates 10 to the rotating shaft 11. Further, each of the end plates 10 prepared in the preparing step has the proximal portion 17, the distal portion 18a, the intermediate bent portion 18b formed between the proximal and distal portions 17 and 18a, and the boss portion 16. In the mounting step, each of the end plates 10 is mounted to the corresponding axial end face 8a of the rotor core 8 with the intermediate bent portion 18b elastically deformed, so that the distal portion 18a is kept in pressed contact with the corresponding axial end face 8a of the rotor core 8 by the elastic force of the intermediate bent portion 18b to restore the portion 18b to its original shape. In the step of fixing the end plates 10 to the rotating shaft 11, each of the end plates 10 is fixed to the rotating shaft 11 by lock-seaming the boss portion 16 of the end plate 10 to the radially outer surface of the rotating shaft 11 with the proximal portion 17 of the end plate 10 abutting the corresponding axial end face 8a of the rotor core 8.

With the above method, during the lock seaming process, the end plates 10 are prevented from moving in the axial direction. As a result, without axial movement of the end plates 10, it is possible to reliably perform the lock seaming process. Moreover, it is also possible to reliably set the axial loads exerted by the distal portions 18a of the end plates 10 on the corresponding axial end faces 8a of the rotor core 8. In addition, it is also possible to secure a higher joining strength between the boss portions 16 of the end plates 10 and the rotating shaft 11 in comparison with the case of crimping the boss portions 16 to the rotating shaft 11 at predetermined circumferential positions using a punch.

[Eighth Embodiment]

This embodiment illustrates a rotor 3 which has a similar configuration to the rotor 3 according to the seventh embodiment; accordingly, only the differences therebetween will be described hereinafter.

In the seventh embodiment, for each of the end plates 10, in the natural state of the end plate 10 before being mounted to the corresponding axial end face 8a of the rotor core 8, the proximal portion 17 of the end plate 10 extends, from the boss portion 16 of the end plate 10, radially outward so as to be parallel to the corresponding axial end face 8a of the rotor core 8. On the other hand, the distal portion 18a of the end plate 10 extends, on the radially outside of the proximal portion 17, radially outward so as to be inclined axially inward with respect to the corresponding axial end face 8a of the rotor core 8 (see FIG. 13).

Figure 15A:
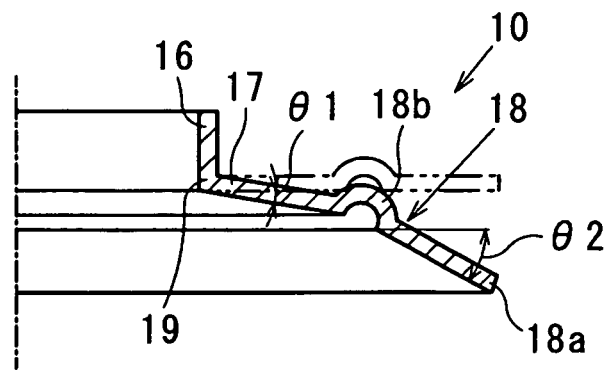
FIG. 15A is a cross-sectional view of part of an end plate according to an eighth embodiment.

In comparison, in the present embodiment, as shown in FIG. 15A, for each of the end plates 10, in the natural state of the end plate 10 before being mounted to the corresponding axial end face 8a of the rotor core 8, the proximal portion 17 of the end plate 10 extends, from the boss portion 16 of the end plate 10, radially outward so as to be inclined axially inward with respect to the corresponding axial end face 8a of the rotor core 8 at a first inclination angle $\theta 1$. On the other hand, the distal portion 18a of the end plate 10 extends, on the radially outside of the proximal portion 17, radially outward so as to be inclined axially inward with respect to the corresponding axial end face 8a of the rotor core 8 at a second inclination angle $\theta 2$. Here, the first inclination angle $\theta 1$ represents an acute angle between the proximal portion 17 and a first imaginary plane that extends parallel to the corresponding axial end face 8a of the rotor core 8 and includes the axially inner opening edge of the boss portion 16 of the end plate 10; the second inclination angle $\theta 2$ represents an acute angle between the distal portion 18a and a second imaginary plane that extends parallel to the corresponding axial end face

8a of the rotor core 8 and includes the axially inner boundary between the distal portion 18a and the intermediate bent portion 18b. Furthermore, the first inclination angle θ1 is set to be less than the second inclination angle θ2 (i.e., θ1<θ2).

In assembling the rotor 3, each of the end plates 10 is pressed on the corresponding axial end face 8a of the rotor core 8, thereby elastically deforming both the intermediate bent portion 18b and the proximal-side bent portion 19 of the end plate 10. Consequently, with the elastic deformation of the intermediate bent portion 18b and the proximal-side bent portion 19, both the proximal and distal portions 17 and 18a of the end plate 10 are brought into abutment with the corresponding axial end face 8a of the rotor core 8, as illustrated with two-dot chain lines in FIG. 15A.

As a result, in the obtained rotor 3, for each of the end plates 10, both the proximal and distal portions 17 and 18a of the end plate 10 are kept in pressed contact with the corresponding axial end face 8a of the rotor core 8 by the elastic forces of the intermediate bent portion 18b and the proximal-side bent portion 19 to restore them to their original shapes as shown in FIG. 15A. In other words, both the proximal and distal portions 17 and 18a of the end plate 10 abut and exert axial loads on the corresponding axial end face 8a of the rotor core 8; the axial loads are created by the elastic forces of the intermediate bent portion 18b and the proximal-side bent portion 19. Therefore, compared to the seventh embodiment, it is possible to more strongly press the corresponding axial end face 8a of the rotor core 8, thereby more reliably preventing the rotor core 8 from spreading axially outward.

[Ninth Embodiment]

This embodiment illustrates a rotor 3 which has a similar configuration to the rotor 3 according to the seventh embodiment; accordingly, only the differences therebetween will be described hereinafter.

In the seventh embodiment, for each of the end plates 10, the intermediate bent portion 18b of the end plate 10 is bent so that in the resultant rotor 3, the entire distal portion 18a is in pressed contact with the corresponding axial end face 8a of the rotor core 8 (see FIG. 12).

Figure 15B:
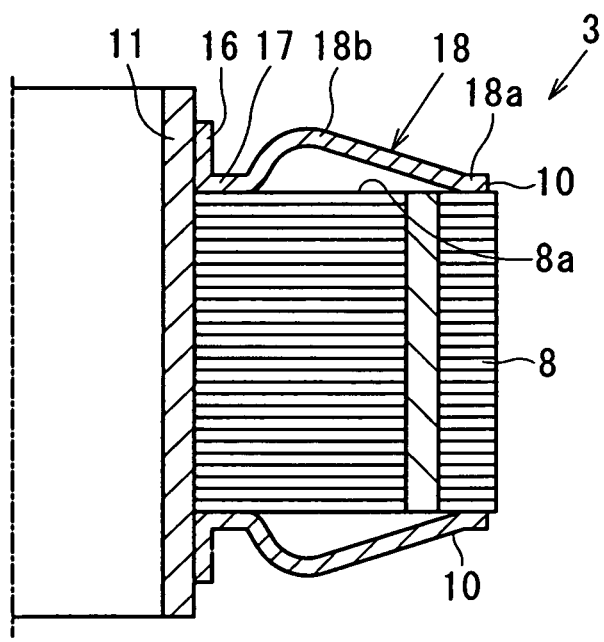
FIG. 15B is a cross-sectional view of part of a rotor according to a ninth embodiment.

In comparison, in the present embodiment, as shown in FIG. 15B, for each of the end plates 10, the intermediate bent portion 18b of the end plate 10 is bent more gently than in the seventh embodiment so that in the resultant rotor 3, only a radially outer end part (or a stator 2-side end part) of the distal portion 18a is in pressed contact with the corresponding axial end face 8a of the rotor core 8. In other words, the distal portion 18a is continuously separated from the corresponding axial end face 8a of the rotor core 8 except for the radially outer end part thereof.

The rotor 3 according to the present embodiment has the same advantages as the rotor 3 according to the seventh embodiment.

[Tenth Embodiment]

This embodiment illustrates a rotor 3 which has a similar configuration to the rotor 3 according to the seventh embodiment; accordingly, only the differences therebetween will be described hereinafter.

In the seventh embodiment, for each of the end plates 10, the intermediate bent portion 18b of the end plate 10 has no through-hole formed therein (see FIG. 12).

Figure 16A:
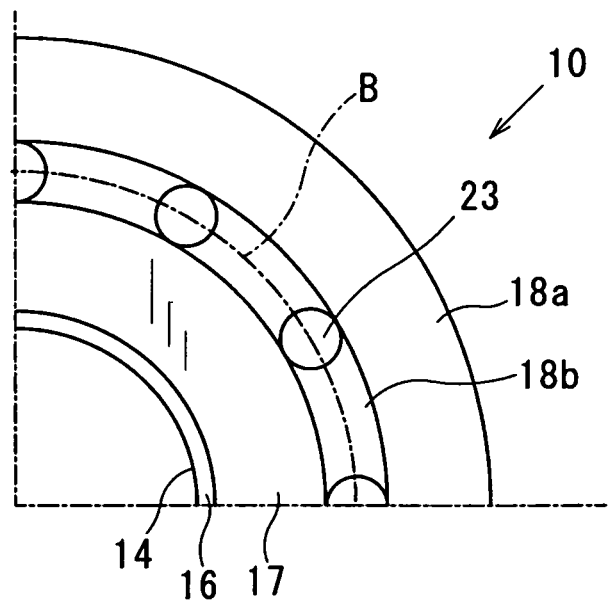
FIGS. 16A and 16B are respectively axial end and cross-sectional views of part of an end plate according to a tenth embodiment.
Figure 16B:
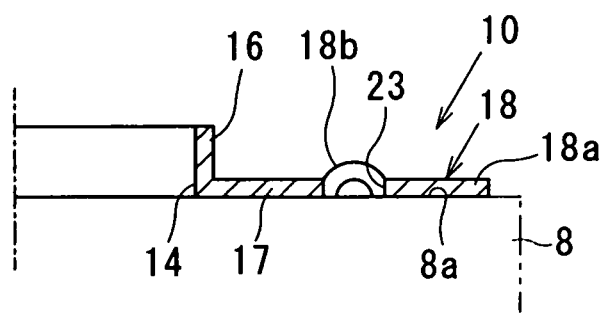

In comparison, in the present embodiment, as shown in FIGS. 16A and 16B, for each of the end plates 10, the intermediate bent portion 18b of the end plate 10 has a plurality (e.g., 12) of through-holes 23 formed therein. The through-holes 23 each axially penetrate the intermediate bent portion 18b and are arranged in the circumferential direction of the end plate 10 at equal intervals.

Moreover, in the present embodiment, each of the through-holes 23 has a substantially circular shape. Further, all the diameters of the through-holes 23 are equal to each other. When viewed along the axial direction of the end plate 10, all the centers of the through-holes 23 are positioned on an imaginary circle B. The imaginary circle B has its center located at the center of rotation of the end plate 10 (or at the center of rotation of the rotor 3) and passes the apex of the intermediate bent portion 18b.

Consequently, with the through-holes 23 fanned therein, the rigidity of the intermediate bent portion 18b is reduced, thereby making it possible to easily deform the intermediate bent portion 18b and reduce stress concentration in the intermediate bent portion 18b.

[Eleventh Embodiment]

This embodiment illustrates a rotor 3 which has a similar configuration to the rotor 3 according to the seventh embodiment; accordingly, only the differences therebetween will be described hereinafter.

In the seventh embodiment, the electric rotating machine 1 is of an inner rotor type in which the rotor 3 is rotatably disposed radially inside of the stator 2 (see FIG. 12).

Figure 17:
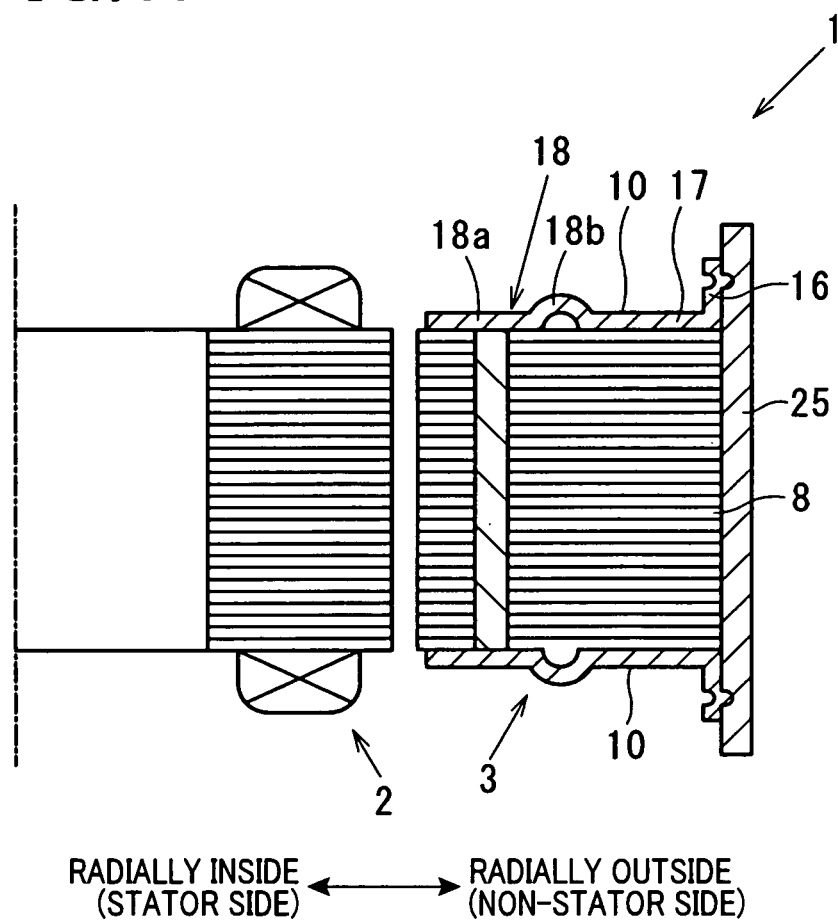
FIG. 17 is a schematic cross-sectional view illustrating the overall configuration of an electric rotating machine which includes a rotor according to an eleventh embodiment.

In comparison, in the present embodiment, as shown in FIG. 17, the electric rotating machine 1 is of an outer rotor type in which the rotor 3 is rotatably disposed radially outside of the stator 2 with the inner circumferential surface (or the radially inner surface) of the hollow cylindrical rotor core 8 radially facing the stator 2.

More specifically, in the present embodiment, the rotor 3 includes, instead of the rotating shaft 11 in the seventh embodiment, a hollow cylindrical rotating drum 25 that is fixed on the outer circumferential surface (or the radially outer surface) of the rotor core 8 so as to rotate together with the rotor core 8.

Each of the end plates 10 has the boss portion 16, the proximal portion 17, the intermediate bent portion 18b and the distal portion 18a that are arranged in this order in a direction from the radially outside to the radially inside of the end plate 10. Moreover, each of the end plates 10 is fixed to the rotating drum 25 by lock-seaming the boss portion 16 of the end plate 10 to the inner circumferential surface (or the radially inner surface) of the rotating drum 25. As a result, all of the rotor core 8, the end plates 10 and the rotating drum 25 are fixed together.

The above-described rotor 3 according to the present embodiment has the same advantages as the rotor 3 according to the seventh embodiment.

While the above particular embodiments and modifications have been shown and described, it will be understood by those skilled in the art that various further modifications, changes, and improvements may be made without departing from the spirit of the invention.

For example, in the previous embodiments, the electric rotating machine 1 is configured as a motor generator. However, the electric rotating machine 1 may also be configured as an electric generator or an electric motor.

In the previous embodiments, the rotor 3 is configured as a permanent magnet-type rotor. However, the rotor 3 may also be configured as a reluctance-type rotor.

In the first to the sixth embodiments, each of the end plates 10 has the through-holes 25 formed therein. However, the through-holes 25 may also be formed in only one of the end plates 10.

In the first to the sixth embodiments, the end plates 10 are mounted to the corresponding axial end faces 8a of the rotor core 8 by means of the pressure-fit rings 27. However, the end plates 10 may also be mounted to the corresponding axial end faces 8a of the rotor core 8 without employing the pressure-fit rings 27.

Figure 11:
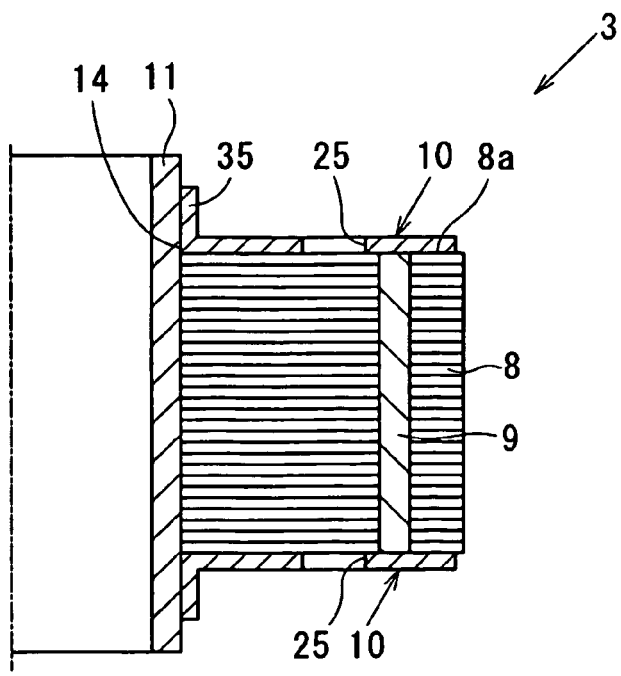
FIG. 11 is a cross-sectional view of part of a rotor according to a modification to the first to the sixth embodiments.

For example, as shown in FIG. 11, it is possible to configure each of the end plates 10 to have a boss portion 35 that extends axially outward and mount the end plates 10 to the corresponding axial end faces 8a of the rotor core 8 by fixing the boss portions 35 of the end plates 10 on the rotating shaft 11.

In the first to the fourth embodiments, each of the end plates 10 has no protrusion 29 formed therein. On the other hand, in the fifth embodiment, each of the end plates 10 has the protrusion 29 formed at the radially outer end portion of the flat annular portion 28. However, it is also possible to modify the end plates 10 of the first to the fourth embodiments to each have a protrusion 29 formed at the radially outer end portion of the distal portion 18.

In the sixth to the eleventh embodiments, each of the end plates 10 is fixed to the rotating shaft 11 or to the rotating drum 25 by lock-seaming the boss portion 16 of the end plate 10 to the radially outer surface of the rotating shaft 11 or to the radially inner surface of the rotating drum 25. However, it is also possible to omit the boss portions 16 from the end plates 10 and fix the end plates 10 to the corresponding axial end faces 8a of the rotor core 8 by means of, for example, rivets.

In the sixth to the eleventh embodiments, each of the end plates 10 is configured to include only the single elastic contacting portion 18 that is comprised of the distal portion 18a and the intermediate bent portion 18b. However, it is also possible to configure each of the end plates 10 to include a plurality of elastic contacting portions 18 that are arranged in the radial direction and each comprised of a distal portion 18a and an intermediate bent portion 18b.

In the sixth to the eleventh embodiments, for each of the end plates 10, the intermediate bent portion 18b of the end plate 10 is formed over the entire circumference (or the entire angular range) of the end plate 10. However, it is also possible to form the intermediate bent portion 18b only for part of the circumference of the end plate 10.

In the sixth to the eleventh embodiments, for each of the end plates 10, the intermediate bent portion 18b of the end plate 10 is bent so as to have the arc-shaped radial cross section that bulges axially outward. However, the intermediate bent portion 18b may also be bent so as to have, for example, a triangular radial cross section that bulges axially outward.

Figure 18A:
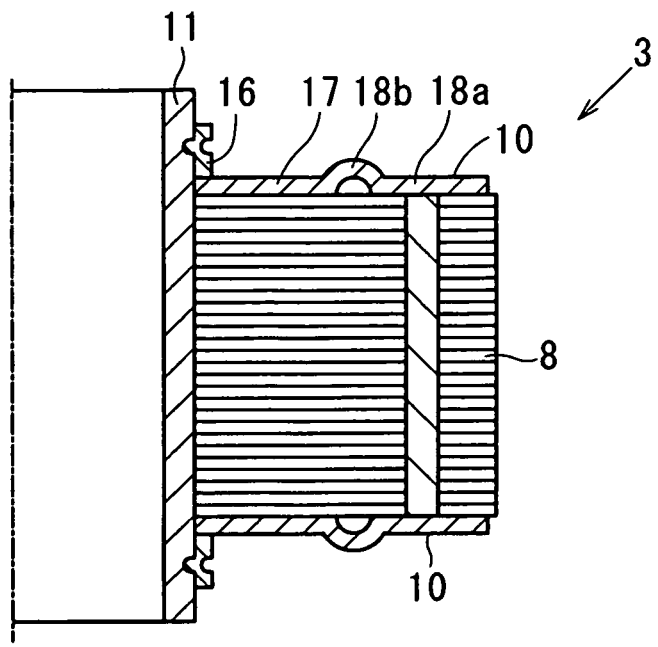
FIG. 18A is a cross-sectional view of part of a rotor according to one modification to the seventh to the eleventh embodiments.

In the sixth to the eleventh embodiments, for each of the end plates 10, the boss portion 16 is integrally formed with the other portions of the end plate 10 into one piece. However, as shown in FIG. 18A, it is also possible to form the boss portion 16 separately from the other portions of the end plate 10 and then assemble the boss portion 16 to the other portions.

Figure 18B:
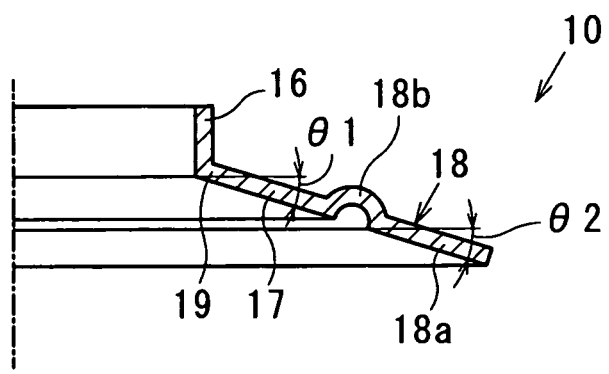
FIG. 18B is a cross-sectional view of part of an end plate according to another modification to the seventh to the eleventh embodiments.

In the eighth embodiment, for each of the end plates 10, the first inclination angle θ1 is set to be less than the second inclination angle θ2 (see FIG. 15A). However, as shown in FIG. 18B, it is also possible to set the first inclination angle θ1 and the second inclination angle θ2 to be equal to each other.

Figure 19:
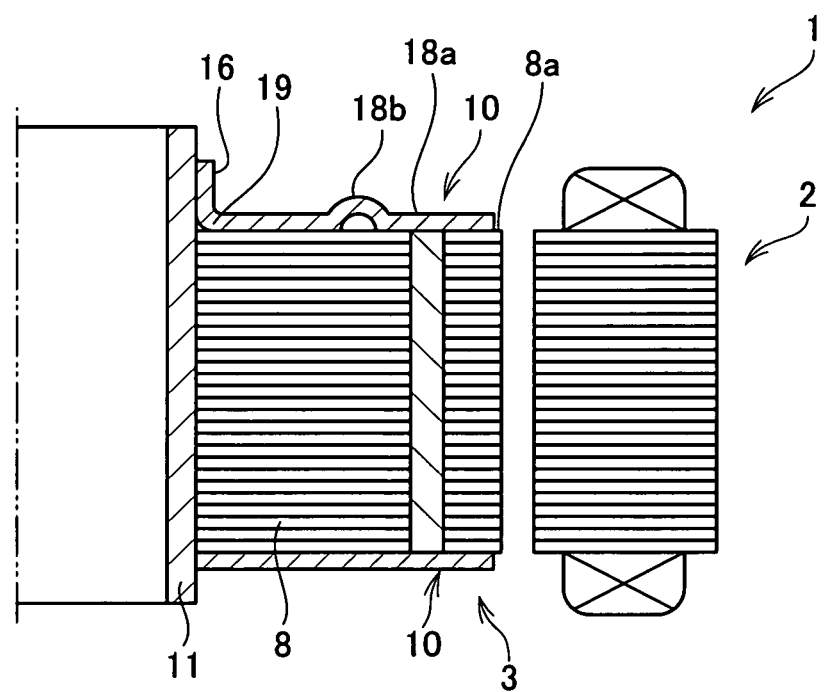
FIG. 19 is a schematic cross-sectional view illustrating the overall configuration of an electric rotating machine which includes a rotor according to yet another modification to the seventh to the eleventh embodiments.

In the sixth to the eleventh embodiments, for each of the end plates 10, the proximal-side bent portion 19 is bent at substantially 90°. However, as shown in FIG. 19, the proximal-side bent portion 19 may also be bent so as to have an arc-shaped radial cross section. In this case, it is possible to suitably set the axial load exerted by the proximal portion 17 of the end plate 10 on the corresponding axial end face 8a of the rotor core 8 by suitably setting the radius of curvature of the arc-shaped radial cross section of the proximal-side bent portion 19.

In the sixth to the eleventh embodiments, each of the end plates 10 is configured to have the proximal portion 17, the distal portion 18a and the intermediate bent portion 18b. However, as shown in FIG. 19, it is also possible to configure only one of the end plates 10 to have the portions 17 and 18a-18b while configuring the other to be flat in shape.

What is claimed is:

1. A rotor for an electric rotating machine, comprising:
a rotor core comprised of a plurality of substantially annular magnetic steel sheets that are laminated in an axial direction of the rotor core, the rotor core having an opposite pair of axial end faces and a circumferential surface that extends in a circumferential direction of the rotor core and connects the axial end faces of the rotor core in the axial direction;
a pair of end plates that are respectively provided on the axial end faces of the rotor core so as to together sandwich the rotor core in the axial direction; and
a plurality of permanent magnets fixed to the rotor core, wherein
the rotor is configured to be rotatably disposed in the electric rotating machine with the circumferential surface of the rotor core radially facing a stator of the electric rotating machine,
at least one of the end plates is configured to have a plurality of through-holes, each of which is formed so as to axially penetrate the end plate, and a pressing portion that is radially positioned on a stator side of the through-holes,
the pressing portion abuts a corresponding one of the axial end faces of the rotor core and exerts an axial load on the corresponding axial end face of the rotor core by an elastic force of the end plate,
the permanent magnets form a plurality of main magnetic poles that are spaced from one another in the circumferential direction of the rotor core,
the rotor further has a plurality of auxiliary magnetic poles each of which is formed by a portion of the rotor core t n a circumferentiatly-adjacent pair of the main magnetic poles and serves to produce reluctance torque of the electric rotating machine,
in the at least one of the end plates, each of the through-holes is formed at a circumferential position corresponding to one of the main and auxiliary magnetic poles, and
those of the through-holes which are respectively formed at the circumferential positions corresponding to the main magnetic poles have a smaller opening area than the other through-holes which are respectively formed at the circumferential positions to the corresponding to the auxiliary magnetic poles.

2. The rotor as set forth in claim 1, wherein each of the through-holes has a maximum radial length at its circumferential center and a maximum circumferential length at its radial center, and
the maximum radial length is equal to the maximum circumferential length.

3. The rotor as set forth in claim 2, wherein each of the through-holes has a substantially circular shape.

4. The rotor as set forth in claim 1, wherein the at least one of the end plates is configured to have an inclined portion in a natural state before being mounted to the corresponding axial end face of the rotor core,
the inclined portion is inclined with respect to the corresponding axial end face of the rotor core so that the distance between the inclined portion and the corresponding axial end face of the rotor core is decreased in a radial direction toward the stator side, the at least one of the end plates is elastically deformed and mounted to the corresponding axial end face of the rotor core so that the inclined portion is displaced axially outward to abut the corresponding axial end face of the rotor core, and at least part of the inclined portion makes up the pressing portion of the at least one of the end plates which exerts the axial load on the corresponding axial end face of the rotor core.

5. The rotor as set forth in claim 1, wherein the at least one of the end plates is configured to have a bent portion in a natural state before being mounted to the corresponding axial end face of the rotor core, the bent portion is bent so as to have a portion of the end plate on a stator side of the bent portion positioned axially inward, and the at least one of the end plates is mounted to the corresponding axial end face of the rotor core with the bent portion elastically deformed, so that the portion of the end plate on the stator side of the bent portion is displaced axially outward to make up the pressing portion of the end plate.

6. The rotor as set forth in claim 5, wherein for the at least one of the end plates, the through-holes are formed in the bent portion of the end plate.

7. The rotor as set forth in claim 1, wherein the at least one of the end plates is configured to have a protrusion that protrudes toward the corresponding axial end face of the rotor core and makes up the pressing portion of the end plate.

8. The rotor as set forth in claim 7, wherein the protrusion has an axially-inner end face which, in a natural state of the end plate before being mounted to the corresponding axial end face of the rotor core, is inclined with respect to the corresponding axial end face of the rotor core so that the distance between the axially-inner end face of the protrusion and the corresponding axial end face of the rotor core is decreased in a radial direction toward the stator side.

9. The rotor as set forth in claim 8, wherein the axially-inner end face of the protrusion is inclined so that an imaginary straight line, which is defined to extend along the axially-inner end face of the protrusion, passes between the radially innermost and radially outermost edges of one of the through-holes of the end plate.

10. A rotor for an electric rotating machine, comprising:
a rotor core comprised of a plurality of substantially annular magnetic steel sheets that are laminated in an axial direction of the rotor core, the rotor core having an opposite pair of axial end faces and a circumferential surface that extends in a circumferential direction of the rotor core and connects the axial end faces of the rotor core in the axial direction; and a pair of end plates that are respectively provided on the axial end faces of the rotor core so as to together sandwich the rotor core in the axial direction, wherein the rotor is configured to be rotatably disposed in the electric rotating machine with the circumferential surface of the rotor core radially facing a stator of the electric rotating machine, at least one of the end plates is configured to have a proximal portion, a distal portion that is radially positioned on a stator side of the proximal portion, and an intermediate bent portion formed between the proximal and distal portions, the at least one of the end plates is mounted to a corresponding one of the axial end faces of the rotor core with the intermediate bent portion elastically deformed, so that at least part of the distal portion is kept, by an elastic force of the intermediate been portion, in pressed contact with the corresponding axial end face of the rotor core over an entire circumference of the end plate, for the at least one of the end plates, the intermediate bent portion of the end plate is bent so as have a concave axially-inner end face separated from the corresponding axial end face of the rotor core and an arc-shaped radial cross section that bulges axially outward, at least part of the proximal portion of the end plate abuts the corresponding axial end face of the rotor core, and the intermediate bent portion of the end plate is formed over the entire circumference of the end plate.

11. The rotor as set forth in claim 10, wherein for the at least one of the end plates, the intermediate bent portion of the end plate has a plurality of through-holes that are formed so as to axially penetrate the intermediate bent portion.

12. The rotor as set forth in claim 10, further comprising a rotating component that is fixed to the rotor core so as to rotate together with the rotor core, wherein the at least one of the end plates is configured to further have a hollow cylindrical boss portion that protrudes axially outward and is in a radial engagement with the rotating component, and the at least one of the end plates is fixed to the rotating component by the radial engagement between the boss portion of the end plate and the rotating component.

13. The rotor as set forth in claim 12, wherein the radial engagement between the boss portion of the end plate and the rotating component is established by lock-seaming the boss portion to the rotating component with at least part of the proximal portion of the end plate abutting the corresponding axial end face of the rotor core.

14. The rotor as set forth in claim 12, wherein for the at least one of the end plates, the boss portion of the end plate is formed at a non-stator-side end of the proximal portion so as to protrude from the proximal portion axially outward, and between the boss portion and the proximal portion, there is formed a proximal-side bent portion that is bent so as to generate an elastic force to press the proximal portion on the corresponding axial end face of the rotor core.

15. The rotor as set forth in claim 14, wherein for the at least one of the end plates, the proximal-side bent portion of the end plate is bent so as to have an arc-shaped radial cross section.

16. A method of manufacturing a rotor for an electric rotating machine, the method comprising the steps of:
preparing a rotor core, a rotating component, and a pair of end plates, the rotor core being comprised of a plurality of substantially annular magnetic steel sheets that are laminated in an axial direction of the rotor core, the rotor core having an opposite pair of axial end faces and a circumferential surface that extends in a circumferential direction of the rotor core and connects the axial end faces of the rotor core in the axial direction;

fixing the rotating component to the rotor core so as to allow the rotating component to rotate together with the rotor core;

mounting the end plates respectively to the axial end faces of the rotor core so that the rotor core is sandwiched between the end plates in the axial direction; and fixing the end plates to the rotating component, wherein the rotor is configured to be rotatably disposed in the electric rotating machine with the circumferential surface of the rotor core radially facing a stator of the electric rotating machine, at least one of the end plates prepared in the preparing step has a proximal portion, a distal portion that is radially positioned on a stator side of the proximal portion, an intermediate bent portion formed between the proximal and distal portions, and a hollow cylindrical boss portion that is formed at a non-stator-side end of the proximal portion so as to protrude from the proximal portion axially outward, in the mounting step, the at least one of the end plates is mounted to a corresponding one of the axial end faces of the rotor core with the intermediate bent portion elastically deformed, so that at least part of the distal portion is kept in pressed contact with the corresponding axial end face of the rotor core by an elastic force of the intermediate bent portion, and in the step of fixing the end plates to the rotating component, the at least one of the end plates is fixed to the rotating component by lock-seaming the boss portion of the end plate to the rotating component with at least part of the proximal portion of the end plate abutting the corresponding axial end face of the rotor core.

* * * * *

UNITED STATES PATENT AND TRADEMARK OFFICE
CERTIFICATE OF CORRECTION

PATENT NO.       : 8,970,085 B2
APPLICATION NO.  : 13/435786
DATED            : March 3, 2015
INVENTOR(S)      : Takahashi et al.

It is certified that error appears in the above-identified patent and that said Letters Patent is hereby corrected as shown below:

In the Claims

Column 24, line 49 "circumferential positions to the corresponding to the" should read
--circumferential positions corresponding to the--

Column 26, line 2 "force of the intermediate been portion, in pressed contact" should read
--force of the intermediate bent portion, in pressed contact--

Signed and Sealed this
Nineteenth Day of July, 2016

Michelle K. Lee
*Director of the United States Patent and Trademark Office*